United States Patent
Selwood et al.

(10) Patent No.: US 10,820,593 B2
(45) Date of Patent: Nov. 3, 2020

(54) METHODS OF PREPARING ALKALOID CONTAINING COMPOSITIONS AND USES THEREOF

(71) Applicant: Syngenta Participations AG, Basel (CH)

(72) Inventors: Andrew Ian Selwood, Nelson (NZ); Jason Leslie John Ryan, Lower Hutt (NZ); Roelof Van Ginkel, Nelson (NZ)

(73) Assignee: SYNGENTA PARTICIPATIONS AG, Basel (CH)

( * ) Notice: Subject to any disclaimer, the term of this patent is extended or adjusted under 35 U.S.C. 154(b) by 540 days.

(21) Appl. No.: 15/534,050

(22) PCT Filed: Dec. 10, 2015

(86) PCT No.: PCT/EP2015/079187
§ 371 (c)(1),
(2) Date: Jun. 8, 2017

(87) PCT Pub. No.: WO2016/091987
PCT Pub. Date: Jun. 16, 2016

(65) Prior Publication Data
US 2017/0332641 A1 Nov. 23, 2017

(30) Foreign Application Priority Data
Dec. 11, 2014 (NZ) ........................................ 702926

(51) Int. Cl.
*A01N 43/90* (2006.01)
*A01N 63/30* (2020.01)
*A01N 65/44* (2009.01)

(52) U.S. Cl.
CPC .............. *A01N 43/90* (2013.01); *A01N 63/30* (2020.01); *A01N 65/44* (2013.01)

(58) Field of Classification Search
CPC ........ A01N 63/30; A01N 43/90; A01N 63/04; A01N 63/10; A01N 63/02; A01N 65/44; A01N 37/46; C12N 1/14; C12N 1/16; Y10S 435/911; Y10S 426/807; A01H 5/12; A01H 15/00; A01H 17/00; A01H 5/10; A01H 3/00; C12P 17/18; C12R 1/645; A23K 20/28; A23K 10/18; C12Q 1/6895; C12Q 2600/156; A01K 1/0154; A23L 29/015; A23L 2/52; A23L 33/145; A23L 33/16; A61K 36/06; A61K 31/5386; C12H 1/0408; C12H 1/0424; Y02A 40/15; A61P 33/00; C05F 11/08; Y02W 30/47
See application file for complete search history.

(56) References Cited

U.S. PATENT DOCUMENTS

| 5,185,028 A | 2/1993 | Powell |
| 2010/0235950 A1 | 9/2010 | Pennell |
| 2011/0195929 A1 | 8/2011 | De Moor et al. |
| 2011/0237538 A1 | 9/2011 | De Moor et al. |

FOREIGN PATENT DOCUMENTS

| AU | 2015213375 A1 | 9/2015 |
| WO | 2005/046674 A2 | 5/2005 |
| WO | 2010/029313 A1 | 3/2010 |

OTHER PUBLICATIONS

Riedell WE; Kieckhefer RE; Petroski RJ; and Powell RG "Naturally-Occurring and Synthetic Loline Alkaloid Derivatives: Insect Feeding Behavior Modification and Toxicityl" J. Entymol. Sci, 1991, 26(1),122-129 (Year: 1991).*
Ada A Bacetty et al: "Chemotaxis Disruption in Pratylenchus Scribneri by Tall Fescue Root Extracts and Alkaloids", Journal of Chemical Ecology, Kluwer Academic Publishers-Plenum Publishers, NE, vol. 35, No. 7, Jul. 3, 2009, pp. 844-850, XP019731208, ISSN: 1573-1561, DOI: 10.1007/S10886-009-9657-X.
Yates S G et al: "Assay of tall fescue seed extracts, fractions, and alkaloids using the large milkweed bug", Journal of Agricultural and Food Chemistry, American Chemical Society, US, vol. 37, No. 2, Mar. 1, 1989, pp. 354-357, XP008122646, ISSN: 0021-8561, DOI: 10.1021 /JF00086A018.
Zavos, P.M. et al.: "Reproductive responses in male rats fed extracts of fescue seed infected by the endophytic fungus Acremonium coenophialum", Grug and Chemical Toxicology, vol. 11 , No. 2, 1988, pp. 113-133.
Mesut Cakmak et al: "An efficient synthesis of loline alkaloids", Nature Chemistry, vol. 3, No. 7, Jun. 19, 2011 , pp. 543-545, XP055241630, GB ISSN: 1755-4330, DOI: 10.1038/nchem.1072.
W E Riedell et al: "Naturally-Occurring and Synthetic Loline Alkaloid Derivatives: Insect Feeding Behavior Modification and Toxicityl,2", J. Entomol. Sci, Jan. 1, 1991, pp. 122-129, XP055241633.
Patchett, B. et al.: "Endophyte-Infected Festuca Pratensis Containing Loline Alkaloids Deters Feeding by Listronotus Bonariensis", Pasture Ecosystems New Zealand Plant Protection, No. 61 ,—2008, pp. 205-209, XP055241636.
International Search Report for International Patent Application PCT/EP2015/079187 dated Jan. 26, 2016.
Written Opinion of the ISR for International Patent Application PCT/EP2015/079187 dated Jan. 26, 2016.

* cited by examiner

*Primary Examiner* — Aaron J Kosar
(74) *Attorney, Agent, or Firm* — Baker & Hostetler LLP; Toni-Junell Herbert

(57) ABSTRACT

The present invention relates to methods of preparing loline alkaloids, compositions comprising loline alkaloids including pesticidal compositions, and uses of the compositions including uses as biological control agents. Methods for the control of pests, including plant or animal pests, and for the enhancement of plant growth or reproduction, and treatment and prevention of insect infection and infestation, for example in plants and animals, are also provided.

19 Claims, 2 Drawing Sheets

METHODS OF PREPARING ALKALOID CONTAINING COMPOSITIONS AND USES THEREOF

RELATED APPLICATION INFORMATION

This application is a 371 of International Application No. PCT/EP2015/079187, filed 10 Dec. 2015, which claims priority to NZ702926, filed 11 Dec. 2014, the contents of which are incorporated herein by reference herein.

FIELD OF THE INVENTION

The present invention relates generally to the field of biology, more particularly to methods of preparing loline alkaloids, compositions comprising loline alkaloids including pesticidal compositions, and uses of the compositions including uses as biological control agents. Methods for the control of pests, including plant or animal pests, and for the enhancement of plant growth or reproduction, and treatment and prevention of insect infection and infestation, for example in plants and animals, are also provided.

BACKGROUND TO THE INVENTION

Loline alkaloids are produced symbiotically during infection of grasses by endophytes, particularly *Epichloë* endophytes (which, following a nomenclature realignment now includes the previously separate anamorph *Neotyphodium* spp.). These endophytes are considered to be bioprotective, conferring pest, and possibly drought and disease protection to the symbionts of which they form part.

However, endophyte infection of grasses commonly used in pastoral agriculture is also associated with toxicity in animals, including fescue toxicosis, ryegrass staggers, and ergotoxicosis. These toxicoses are believed to result from complex reactions by animals to various alkaloids produced in endophyte/grass symbionts under various plant growth conditions. These animal toxicoses are responsible for significant economic losses, both directly with loss of livestock, and indirectly via costs associated with remediation.

There is a need for a robust and/or scalable method for preparing loline alkaloids from plant material from plant/endophyte symbionts, such as milled herbage, or seeds, for example to provide compositions for the control of insect pests which are not presently available.

Existing methods, typically conducted at laboratory scale, all use milled, ground or processed plant or seed material as the source material for the preparation of lolines, but reported recovery is uneconomic.

To the applicant's knowledge, there are no reports of the successful production or extraction of lolines at scale, for example, from whole seeds.

It is an object of the present invention to provide methods of preparing one or more loline alkaloids from plant material, and/or of obtaining one or more of the bioprotective effects associated with the presence of loline alkaloids in endophyte/plant symbiosis, which overcome or at least ameliorates some of the abovementioned disadvantages or which at least provides the public with a useful choice.

Other objects of the invention may become apparent from the following description which is given by way of example only.

In this specification, where reference has been made to external sources of information, including patent specifications and other documents, this is generally for the purpose of providing a context for discussing the features of the present invention. Unless stated otherwise, reference to such sources of information is not to be construed, in any jurisdiction, as an admission that such sources of information are prior art or form part of the common general knowledge in the art.

SUMMARY OF THE INVENTION

In a first aspect, the invention provides a method of producing a composition comprising one or more loline alkaloids, the method comprising the steps of
 a) providing plant material derived from a plant that is or has been infected with at least one endophyte,
 b) admixing the plant material and an aqueous solution,
 c) maintaining the admixture at a temperature of at least about 50° C. to provide an extract comprising one or more loline alkaloid compound,
 d) recovering the extract, and optionally further purifying the extract, to form the composition.

In one embodiment, at least some of the plant material is milled. For example, all of the plant material is milled.

In one embodiment, the milled plant material does not comprise seeds.

In one embodiment, the invention provides a method of producing a composition comprising one or more loline alkaloids, the method comprising the steps of
 a) providing whole seeds derived from a plant that is or has been infected with at least one endophyte,
 b) admixing the seeds and an aqueous solution,
 c) maintaining the admixture at a temperature of at least about 50° C. to provide an extract comprising one or more loline alkaloids,
 d) recovering the extract/supernatant, and optionally further purifying the extract, to provide a composition comprising one or more loline alkaloids.

Accordingly, in one embodiment the invention relates to a method of producing a composition comprising one or more loline alkaloids, comprising the steps of
 a) providing whole seeds derived from a plant that is or has been infected with at least one endophyte,
 b) admixing the seeds and an aqueous solution having a temperature of at least about 65° C.,
 c) maintaining the admixture at a temperature from about 65° C. to about 100° C. for a period sufficient to provide an extract comprising one or more loline alkaloids,
 d) recovering the extract, and optionally further purifying the extract, to provide a composition comprising one or more loline alkaloids.

In another embodiment the invention relates to a method of producing a composition comprising one or more loline alkaloids, comprising the steps of
 a) providing whole seeds derived from a plant that is or has been infected with at least one endophyte,
 b) admixing the seeds and an aqueous solution having a temperature of at least about 85° C.,
 c) maintaining the admixture at a temperature from about 85° C. to about 100° C. for a period sufficient to provide an extract comprising one or more loline alkaloids,
 d) recovering the extract, and optionally further purifying the extract, to provide a composition comprising one or more loline alkaloids.

In one example, the admixture is maintained for a period of at least about 15 minutes. For example, the admixture is maintained for a period of at least about 30 minutes, at least about 45 minutes, or at least about 1 hour.

In one example, the period sufficient to provide the extract is from about 1 hour to about 6 hours.

In a second aspect, the invention provides a method of extracting one or more loline alkaloids from seeds, the method comprising the steps of
a) providing whole seeds derived from a plant that is or has been infected with at least one endophyte,
b) admixing the seeds and an aqueous solution,
c) maintaining the admixture at a temperature of at least about 50° C. to provide an extract comprising one or more loline alkaloids,
d) recovering the extract, and optionally further purifying the extract.

In a third aspect, the invention provides a method of producing a composition comprising one or more loline alkaloids, the method comprising the steps of
a) providing plant material derived from a plant that is or has been infected with at least one endophyte,
b) admixing the plant material and water,
c) maintaining the admixture at a temperature of at least about 65° C. to provide an extract comprising one or more loline alkaloid compound,
d) recovering the extract, and optionally further purifying the extract, to form a composition wherein the plant material does not comprise seeds.

In a fourth aspect, the invention provides a method of extracting one or more loline alkaloids from plant material, the method comprising the steps of
a) providing plant material derived from a plant that is or has been infected with at least one endophyte,
b) admixing the plant material and water,
c) maintaining the admixture at a temperature of at least about 65° C. to provide an extract comprising one or more loline alkaloid compound,
d) recovering the extract, and optionally further purifying the extract, wherein the plant material does not comprise seeds.

In a fifth aspect, the invention provides a method of producing a composition comprising one or more loline alkaloids, the method comprising the steps of
a) providing milled plant material derived from a plant that is or has been infected with at least one endophyte,
b) admixing the plant material and an aqueous solution,
c) maintaining the admixture at a temperature of at least about 50° C. for a period of at least about 15 minutes to provide an extract comprising one or more loline alkaloid compound,
d) recovering the extract, and optionally further purifying the extract, to form a composition comprising one or more loline alkaloids.

In a sixth aspect the invention provides a composition or extract comprising, consisting essentially of, or consisting of one or more loline alkaloids produced by a method of the invention.

In a seventh aspect the invention provides a method of producing a composition comprising one or more loline alkaloids, the method comprising
providing an extract prepared by a method of the invention
a) combining the one or more loline alkaloids with a carrier, or
b) combining the supernatant or an extract or fraction therefrom with a carrier, or
c) separating the one or more loline alkaloids from the supernatant, and optionally combining said separated one or more loline alkaloids with a carrier, or
d) at least partially purifying or isolating the one or more loline alkaloids, and optionally combining said purified or isolated one or more loline alkaloids with a carrier, or
e) any combination of two or more of (a) to (e), thereby to provide the composition.

In an eighth aspect, the present invention provides a method for concentrating one or more loline alkaloids from a source material, the source material comprising an aqueous solution comprising one or more loline alkaloids, the method comprising
a) providing a chromatography stationary phase capable of binding an organic molecule,
b) contacting the source material with the stationary phase for a time sufficient to allow the stationary phase to bind one or more loline alkaloids,
c) eluting the stationary phase-bound one or more loline alkaloids by chromatography thereby providing an eluate, and
d) recovering the eluate comprising one or more loline alkaloids.

In one embodiment the method of concentrating is concentrating with respect to solvent volume, and may or may not involve a relative concentration increase of one or more loline alkaloids with respect to one or more other compounds.

The following embodiments may relate to any of the aspects herein.

In various embodiments the loline alkaloid comprises one or more loline alkaloids of Formula [I]:

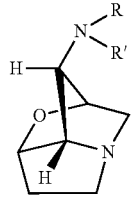

FORMULA [I]

wherein:
R=H or $CH_3$ and
R'=H, $CH_3$, CHO, $COCH_3$.
More specifically, Formula [I] includes:
loline where R=$CH_3$ and R'=H;
norloline where R=H and R'=H;
N-methylloline where R=$CH_3$ and R'=$CH_3$;
N-formylloline where R=$CH_3$ and R'=CHO;
N-formylnorloline where R=H and R'=CHO;
N-acetylloline where R=$CH_3$ and R'=$COCH_3$;
N-acetylnorloline where R=H and R'=$COCH_3$.

In various embodiments, the one or more loline alkaloids is selected from the group consisting of loline, N-acetylloline (NAL), N-formylloline (NFL), N-acetylnorloline (NANL), and N-methylloline (NML).

In one embodiment, the endophyte is characterised by producing at least one loline alkaloid compound. More preferably, endophytes include those of the genus *Epichloë* (also known as *Neotyphodium*).

It will be appreciated that the one or more *Neotyphodium* or *Epichloë* endophytes is one or more isolate that is capable of producing one or more loline alkaloids when present as a plant/endophyte symbiont.

In various embodiments, the one or more *Neotyphodium* or *Epichloë* endophyte is a *Neotyphodium uncinatum* isolate.

In one embodiment, the *Neotyphodium uncinatum* isolate is selected from the isolates described herein.

It will be appreciated that the whole seeds are seeds that are substantially intact, and that have not been milled, ground or otherwise physically altered, for example to increase surface area, or for example by removing, piercing or compromising the integrity of the seed cuticle. In one embodiment the whole seeds are seeds capable of germination.

In one embodiment the seeds or plant material is derived from the genus *Festuca*. Preferably, the plant or part thereof is a meadow fescue or tall fescue species grass.

In various embodiments the plant material comprises the entire plant, roots, leaves, flowers, stems, pseudo-stems and the like. In one embodiment the plant material comprises the herbage of the plant.

In one embodiment the plant material is dried, for example, freeze-dried. In one embodiment the plant material is milled.

In one embodiment the aqueous solution comprises water. In one embodiment the aqueous solution comprises acid or base, for example, ammonium hydroxide or acetic acid. In another embodiment the aqueous solution comprises an organic solvent, for example, methanol, ethanol, acetone, acetonitrile, propanol or 2-propanol. In one embodiment the aqueous solution comprises acetic acid. In a further embodiment the aqueous solution comprises ammonia.

In one embodiment the aqueous solution or water is heated to an extraction temperature before admixing with the seeds or plant material. In another embodiment the aqueous solution or water is heated to an extraction temperature after admixing the seeds or plant material and water or aqueous solution.

In various embodiments the seeds or plant material is admixed with an aqueous solution or water having a temperature of at least about 50, 55, 60, 65, 70, 75, 80, 85, 90, 95, 98, 99, 100, 105, 110, 115 or about 120° C., and useful ranges may be selected between any of these values (for example, about 50 to about 120, about 50 to about 110, about 50 to about 100, about 50 to about 99, about 50 to about 95, about 50 to about 90, about 50 to 85, about 50 to about 80, about 60 to about 120, about 60 to about 110, about 60 to about 100, about 60 to about 99, about 60 to about 95, about 60 to about 90, about 60 to about 85, about 60 to about 80, about 70 to about 120, about 70 to about 110, about 70 to about 100, about 70 to about 99, about 70 to about 98, about 70 to about 95, about 70 to about 90, about 70 to about 85, about 70 to about 80, about 75 to about 120, about 75 to about 110, about 75 to about 100, about 75 to about 99, about 75 to about 98, about 75 to about 95, about 75 to about 90, about 75 to about 85, about 75 to about 80, about 80 to about 120, about 80 to about 110, about 80 to about 100, about 80 to about 99, about 80 to about 98, about 80 to about 95, about 80 to about 90, about 85 to about 120, about 85 to about 110, about 85 to about 100, about 85 to about 99, about 85 to about 98, about 85 to about 95, about 90 to about 120, about 90 to about 110, about 90 to about 100, about 90 to about 99, about 90 to about 98, about 95 to 98, or about 90 to about 95° C.).

In a particularly contemplated embodiment, the milled plant material that does not comprise milled seeds is admixed with an aqueous solution or water having a temperature of at least about 50° C.

In another particularly contemplated embodiment, the whole seeds are admixed with an aqueous solution or water having a temperature of at least about 50° C., for example, from about 50° C. to about 75° C.

In another particularly contemplated embodiment where the milled plant material is or comprises milled seeds, the plant material or milled seeds are admixed with an aqueous solution or water having a temperature of at least about 90° C., for example, from about 90° C. to about 98° C., or from about 95° C. to about 98° C.

For example, in one embodiment wherein the milled plant material is or comprises milled seeds, a) the milled plant material is admixed with an aqueous solution or water having a temperature of at least about 90° C., or b) the admixture is maintained at a temperature of at least about 90° C. for a period of at least about 15 minutes, or c) both a) and b) above.

In another embodiment wherein the milled plant material is or comprises milled seeds, a) the milled plant material is admixed with an aqueous solution or water having a temperature of from about 95° C. to about 98° C., or b) the admixture is maintained at a temperature of from about 95° C. to about 98° C. for a period of at least about 15 minutes, or c) both a) and b) above.

In various embodiments, the pH of the aqueous solution is adjusted to or maintained at a pH of about 6, 6.5, 7, 7.5, 8, 8.5, 9, 9.5 or about pH 10, and useful ranges may be selected between any of these values (for example, about 6 to about 10, about 6 to about 9.5, about 6 to about 9, about 7 to about 10, about 7 to about 9.5, about 7 to about 9, about 8 to about 10, about 8 to about 9.5, or about 8 to about 9). In various embodiments, the pH of the water is maintained at a pH of about 7.

In one example, the aqueous solution has a pH greater than 7. In one example, the aqueous solution has a pH of from at least 7 to about 9. In another example, the aqueous solution has a pH of from at least about 7.5 to about 9.

In one example, the aqueous solution has a pH lower than 7. In one example, the aqueous solution has a pH of from about 4.5 to about 7. In another example, the aqueous solution has a pH of from about 4.5 to about 6.5.

In one embodiment, the aqueous solution or water has a volume greater than about 50 L. In one embodiment, the aqueous solution volume is greater than about 100 L, greater than about 150 L, greater than about 200 L, greater than about 300 L, greater than about 400 L, greater than about 500 L, or greater than about 1000 L.

In one embodiment the aqueous solution or water has a volume of about 1 L per kg plant material or seed. In one embodiment, the aqueous solution volume is greater than about 2 L per kg plant material or seed, greater than about 3 L per kg plant material or seed, greater than about 4 L per kg plant material or seed, greater than about 5 L per kg plant material or seed, greater than about 7.5 L per kg plant material or seed, greater than about 10 L per kg plant material or seed, greater than about 12.5 L per kg plant material or seed, greater than about 15 L per kg plant material or seed, greater than about 17.5 L per kg plant material or seed, greater than about 20 L per kg plant material or seed, greater than about 25 L per kg plant material or seed, or greater than about 30 L per kg plant material or seed.

In various embodiments the admixture is maintained at a temperature of at least about 50, 55, 60, 65, 70, 75, 80, 85, 90, 95, 98, 99 or about 100° C., and useful ranges may be selected between any of these values (for example, about 50 to about 99, about 50 to about 95, about 50 to about 90, about 50 to 85, about 50 to about 80, about 60 to about 100, about 60 to about 99, about 60 to about 95, about 60 to about 90, about 60 to about 85, about 60 to about 80, about 70 to about 100, about 70 to about 99, about 70 to about 98, about 70 to about 95, about 70 to about 90, about 70 to about 85, about 70 to about 80, about 75 to about 100, about 75 to about 99, about 75 to about 98, about 75 to about 95, about 75 to about 90, about 75 to about 85, about 75 to about 80, about 80 to about 100, about 80 to about 99, about 80 to about 98, about 80 to about 95, about 80 to about 90, about 85 to about 100, about 85 to about 99, about 85 to about 98, about 85 to about 95, about 90 to about 100, about 90 to about 99, about 90 to about 98, or about 90 to about 95° C.).

In a particularly contemplated embodiment, the admixture comprising or consisting of milled plant material that does not comprise seeds is maintained at a temperature of at least about 50° C.

In another particularly contemplated embodiment, the admixture comprising or consisting of whole seeds is maintained at a temperature of at least about 50° C., for example, from about 50° C. to about 75° C.

In another particularly contemplated embodiment where the milled plant material is or comprises milled seeds, the admixture is maintained at a temperature of at least about 90° C., for example, from about 90° C. to about 98° C., or from about 95° C. to about 98° C.

In one embodiment the admixture is maintained at a pressure of about one atmosphere. In another embodiment the admixture is maintained at a pressure greater than one atmosphere. In various embodiments the admixture is maintained at a pressure of about 1.1, 1.2, 1.3, 1.4, 1.5, or at about 2 bar, and useful ranges may be selected between any of these values (for example, about 1.1 bar to about 1.5 bar, or at about 1.2 bar to about 1.5 bar, or at about 1.2 bar to about 1.4 bar) In another embodiment the admixture is maintained at a pressure of about 2 bar, or at greater than 2 bar).

In one embodiment, for example an embodiment using whole seeds, the admixture is maintained until one or more of the loline alkaloids or is present at a concentration of at least about 0.025, 0.05, 0.1, 0.15, 0.2, 0.25, 0.3, 0.5, 0.75, 1, 1.25, 1.5, 1.75 or 2 mg/mL. In another embodiment for example an embodiment using plant herbage, the admixture is maintained until the total loline alkaloid concentration is at least about 0.01, 0.015, 0.02, 0.025, 0.05, 0.1, 0.15, 0.2, 0.25, 0.3, 0.5, 0.75, 1, 1.25, 1.5, 1.75 or 2 mg/mL.

In one embodiment the admixture is maintained for a period sufficient to extract one or more loline alkaloids. In various embodiments the admixture is maintained for a period of at least about 2, 5, 7, 10, 15, 20, 25, 30, 40, 45, 50 or 60 minutes or about 0.5, 1, 1.5, 2, 2.5, 3, 3.5, 4, 4.5, 5, 5.5, 6, 6.5, 7.5, 8, 9, 10, 11, 12, 18, or about 24 hours, and useful ranges may be selected between any of these values (for example, about 5 to 60, 5 to 45, 5 to 30, 5 to 20, 5 to 15, 10 to 60, 10 to 45, 10 to 30, 10 to 20, 15 to 60, 15 to 45, 15 to 30, 20 to 60, 30 to 45, or about 20 to 30 minutes, or about 0.5 to 12, 0.5 to 6, 0.5 to 3, 1 to 12, 1 to 6, 1 to 5, 1 to 3, 2 to 12, 2 to 6, 2 to 5, 2 to 3, 2.5 to 12, 2.5 to 6, 2.5 to 5, 2.5 to 4, or about 2.5 to 3 hours).

In one embodiment, the admixture is maintained until the concentration of NAL is at least about 10 µg/mL. For example, the admixture is maintained until the concentration of NAL is at least about 20 µg/mL, at least about 25 µg/mL, at least about 30 µg/mL, at least about 35 µg/mL, at least about 40 µg/mL, at least about 45 µg/mL, at least about 50 µg/mL, at least about 60 µg/mL, at least about 70 µg/mL, at least about 75 µg/mL, at least about 100 µg/mL, at least about 200 µg/mL, at least about 300 µg/mL, or at least about 400 µg/mL.

In one embodiment, the admixture is maintained until the concentration of NANL is at least about 5 µg/mL. For example, the admixture is maintained until the concentration of NANL is at least about 10 µg/mL, at least about 15 µg/mL, at least about 20 µg/mL, at least about 25 µg/mL, at least about 30 µg/mL, at least about 40 µg/mL, at least about 50 µg/mL, at least about 60 µg/mL, at least about 70 µg/mL, at least about 80 µg/mL, at least about 90 µg/mL, at least about 100 µg/mL, at least about 110 µg/mL, at least about 120 µg/mL, at least about 130 µg/mL, or at least about 140 µg/mL or at least about 150 µg/mL.

In one embodiment, the admixture is maintained until the concentration of NFL is at least about 100 µg/mL. For example, the admixture is maintained until the concentration of NFL is at least about 125 µg/mL, at least about 150 µg/mL, at least about 175 µg/mL, at least about 200 µg/mL, at least about 225 µg/mL, at least about 250 µg/mL, at least about 300 µg/mL, at least about 350 µg/mL, at least about 400 µg/mL, at least about 450 µg/mL, at least about 500 µg/mL, at least about 550 µg/mL, at least about 600 µg/mL, at least about 650 µg/mL, at least about 700 µg/mL, or at least about 750 µg/mL.

In one embodiment, the predominant loline alkaloid is NFL.

In various embodiments, for example in embodiments using whole seeds, the ratio of [NAL]:[NFL] in the composition or extract is greater than about 1:10, about 1:8, about 1:6, about 1:5, about 1:4, about 1:3 or about 1:2. In one exemplary embodiment, the ratio of [NAL]:[NFL] is about 1:3.

In various embodiments, for example in embodiments using herbage, the ratio of [NAL]:[NFL] in the composition or extract is greater than about 1:8, about 1:6, about 1:4, about 3:11, about 1:3, or about 1:2. In one exemplary embodiment, the ratio of [NAL]:[NFL] is about 3:11.

In various embodiments, for example in embodiments using whole seeds, the ratio of [NANL]:[NFL] in the composition or extract is greater than about 1:12, about 1:10, about 1:8.5, about 1:8, about 1:7.5, about 1:7, about 1:6 or about 1:5. In one exemplary embodiment, the ratio of [NAL]:[NFL] is about 1:7.5.

In various embodiments, for example in embodiments using herbage, the ratio of [NANL]:[NFL] in the composition or extract is greater than about 3:4, about 2:3, about 1:2, about 6:11, or about 1:1. In one exemplary embodiment, the ratio of [NAL]:[NFL] is about 6:11.

In various embodiments, for example in embodiments using whole seeds, the ratio of [NANL]:[NAL] in the composition or extract is greater than about 1:5, about 1:4, about 1:3, about 1:2, about 2:3, 4:5 or about 5:6. In one exemplary embodiment, the ratio of [NAL]:[NFL] is about 2:3.

In various embodiments, for example in embodiments using herbage, the ratio of [NANL]:[NAL] in the composition or extract is greater than about 6:5, about 5:4, about 3:2, about 2:1, about 3:1, or about 4:1. In one exemplary embodiment, the ratio of [NAL]:[NFL] is about 2:1.

In one embodiment the extract is subjected to one or more at least partial purification steps.

In various embodiments, the pH of the extract is adjusted to or maintained at a pH of about 6, 6.5, 7, 7.5, 8, 8.5, 9, 9.5 or about pH 10, and useful ranges may be selected between any of these values (for example, about 6 to about 10, about 6 to about 9.5, about 6 to about 9, about 7 to about 10, about 7 to about 9.5, about 7 to about 9, about 8 to about 10, about 8 to about 9.5, or about 8 to about 9).

In one embodiment the at least partial purification comprises cooling the extract to precipitate solids present in the extract and separating the precipitated solids from the extract. In various embodiments the extract is cooled to a temperature of at least about 1, 2, 3, 4, 5, 6, 7, 8, 9, 10, 12, 14, 15, 16, 18 or about 20° C., and useful ranges may be selected between any of these values (for example, about 1 to 20, 1 to 15, 1 to 10, 1 to 9, 1 to 8, 1 to 6, 1 to 5, 2 to 20, 2 to 15, 2 to 10, 2 to 9, 2 to 8, 2 to 6, 2 to 5, 3 to 20, 3 to 15, 3 to 10, 3 to 8, 3 to 6, 4 to 20, 4 to 15, 4 to 10, 4 2 9, 4 to 8, 4 to 6, 5 to 20, 5 to 15, 5 to 10, 5 to 9, or about 5 to 8° C.). In a particularly preferred embodiment the supernatant is cooled to a temperature of about 2 to about 8° C.

In various embodiments, the at least partial purification comprises separating by filtration, for example, nanofiltration, ultrafiltration, or microfiltration.

In one embodiment the at least partial purification comprises filtering the extract using one or more sediment filters to produce a filtrate. In one embodiment the extract is adjusted to about pH 9 before filtering. In various embodiments the sediment filter has a pore size of about 1, 2.5, 5, 7.5, 10, 12.5, 15, 20, 25 or 30 μm. In various embodiments two or more sediment filters of different pore sizes are used in series. In various embodiments, the filter has a graded-density having a larger pore size rating on the inflow decreasing to a smaller pore size rating on the outflow. For example, the filter is a graded-density pore size of 75 μm-25 μm, or a graded-density pore size of 50 μm-5 μm, or a graded-density pore size of 25 μm-1 μm.

In one example, the at least partial purification comprises sequential filtration using two or more filters to produce a filtrate. In one example, the at least partial purification comprises sequential filtration through two or more filters, wherein each filter has a smaller pore size than the preceding filter. In one example, the at least partial purification comprises sequential filtration using two or more graded-density filters.

In various embodiments, the at least partial purification comprises drying or evaporation, such as spray drying, or precipitation.

In one embodiment, the at least partial purification comprises separating by supercritical extraction.

In one embodiment the at least partial purification comprises separating by liquid-liquid partitioning (liquid-liquid extraction or solvent extraction).

In one embodiment the at least partial purification comprises separating by chromatography.

For example, in one embodiment the at least partial purification comprises the steps of contacting the extract or filtrate with one or more chromatography stationary phases for a time sufficient to allow the stationary phase to bind one or more loline alkaloids, separating by chromatography one or more contaminants from the stationary phase-bound one or more loline alkaloids, or concentrating by chromatography the stationary phase-bound one or more loline alkaloids, and recovering the one or more loline alkaloids.

In one embodiment, the stationary phase is a reverse phase chromatography stationary phase for example, a reverse phase chromatography stationary phase comprising a hydrophobic matrix. In one embodiment the stationary phase comprises a non-selective adsorbent. In one embodiment, the stationary phase is a polymeric adsorbent suitable for binding at least moderately polar compounds. In one embodiment the stationary phase is held in a column.

In one embodiment the stationary phase comprises a styrene-divinylbenzene polymer resin, for example, Strata-X™ SPE resin, Sepabeads® SP-207 resin, Sepabeads® SP-70 resin or Diaion® HP-20 resin.

In one embodiment the one or more loline alkaloids are recovered using a polar organic solvent, or a mixed aqueous organic solvent, for example, ethanol to provide an eluate comprising the one or more loline alkaloids. In one embodiment two or more fractions comprising the one or more loline alkaloids are recovered and combined to form the eluate.

In one exemplary embodiment the at least partial purification comprises the steps of contacting the extract or filtrate in a polar solvent with a styrene-divinylbenzene polymer resin for a time sufficient to allow the stationary phase to bind one or more loline alkaloids, eluting the one or more loline alkaloids using a solution comprising from about 5% to about 99% ethanol, preferably about 96% ethanol to produce an eluate, and collecting the eluate.

In one embodiment, the pH of the extract or filtrate is adjusted to a pH of at least about pH 9 before the extract is contacted with the stationary phase. For example, the pH of the extract is adjusted to a pH of at least about pH 9 before the extract is filtered.

In one embodiment the pH of the extract or filtrate is adjusted to a pH of from about pH 10 to about pH 12 before the extract or filtrate is contacted with the stationary phase.

In one embodiment the solvent may be removed from the eluate comprising the one or more loline alkaloids by evaporating the solvent, for example, by rotary evaporation, or wiped or falling film evaporation.

In one embodiment the eluate comprising one or more loline alkaloids and aqueous solution is further purified by admixing the eluate and a solvent, for example, acetonitrile, ethanol or methanol to precipitate one or more impurities or contaminants in the eluate. The solvent phase comprising the one or more loline alkaloids may be separated from the precipitate by decanting.

In one embodiment the at least partial purification comprises the step of contacting the extract, filtrate or eluate with a carbon source, for example activated charcoal, and recovering a purified fraction.

In one embodiment solvent is removed from the extract, filtrate, eluate or purified fraction by evaporating the solvent, for example by rotary evaporation, and recovering a dried product comprising the one or more loline alkaloids.

In one exemplary embodiment the invention provides a method of producing a composition comprising one or more loline alkaloids or a method of extracting one or more loline alkaloids from seeds, the method comprising the steps of a) providing whole seeds derived from a plant infected with at least one endophyte, b) admixing the seeds and an aqueous solution having a temperature of at least about 85° C., c) maintaining the admixture at a temperature of at about 85° C. to about 100° C. for a period of from about 1 to about 6 hours to provide an extract comprising one or more loline alkaloids, d) recovering the extract, e) contacting the extract with a chromatography stationary phase to bind one or more loline alkaloids to the stationary phase, f) eluting the one or more loline alkaloids from the stationary phase using a solvent to recover an eluate comprising one or more loline alkaloids, g) admixing the eluate with solvent to precipitate one or more impurities and separating the precipitated solids from the eluate to produce a solvent-purified extract, h) filtering the solvent-purified extract, and recovering a purified extract, and i) evaporating solvent from the purified extract and recovering a dried purified extract, to provide a composition comprising one or more loline alkaloids.

In another exemplary embodiment the invention provides a method of producing a composition comprising one or more loline alkaloids or a method of extracting one or more loline alkaloids from seeds, the method comprising the steps of a) providing whole seeds derived from a plant infected with at least one endophyte, b) admixing the seeds and an aqueous solution having a temperature of at least about 85° C., c) maintaining the admixture at a temperature of at about 85° C. to about 100° C. for a period of from about 1 to about 6 hours to provide an extract comprising one or more loline alkaloids, d) recovering the extract, e) cooling the extract to precipitate solids present in the supernatant and separating the precipitated solids from the extract to produce a cooled extract, f) filtering the cooled extract using one or more sediment filters to produce a filtered extract, g) contacting the filtered extract with a chromatography stationary phase to bind one or more loline alkaloids to the stationary phase, h) eluting the one or more loline alkaloids from the stationary phase using a solvent to recover an eluate comprising one or more loline alkaloids, i) evaporating the solvent from the eluate to produce a concentrated eluate, j) admixing the eluate with aqueous solution and solvent, preferably acetonitrile, to precipitate one or more impurities and separating the precipitated solids from the eluate to produce a solvent-purified extract, k) contacting the solvent-purified extract with activated charcoal, and recovering a purified extract, and l) evaporating solvent from the purified extract and recovering a dried purified extract, to provide a composition comprising one or more loline alkaloids.

In another exemplary embodiment the invention provides a method of producing a composition comprising one or more loline alkaloids, the method comprising the steps of a) providing plant material derived from a plant that is or has been infected with at least one endophyte, b) admixing the plant material and water, c) maintaining the admixture at a temperature of at least about 65° C. for a period of about 15 to about 60 minutes to provide an extract comprising one or more loline alkaloid compound, d) recovering the extract, and optionally further purifying the extract, to form a composition wherein the plant material does not comprise seeds.

In another exemplary embodiment the invention provides a method of producing a composition comprising one or more loline alkaloids, the method comprising the steps of a) providing milled plant material derived from a plant that is or has been infected with at least one endophyte, b) admixing the milled plant material and an aqueous solution, c) maintaining the admixture at a temperature of at least about 50° C. for a period of at least about 15 minutes to provide an extract comprising one or more loline alkaloid compound, d) recovering the extract, and optionally further purifying the extract, to form a composition comprising one or more loline alkaloids.

In another exemplary embodiment the invention provides a method of producing a composition comprising one or more loline alkaloids, the method comprising the steps of a) providing milled plant material derived from a plant that is or has been infected with at least one endophyte, b) admixing the milled plant material and an aqueous solution having a pH of at least 7, c) maintaining the admixture at a temperature of at least about 50° C. for a period of at least about 15 minutes to provide an extract comprising one or more loline alkaloid compound, d) filtering the extract to provide a filtrate, e) adjusting the pH of the filtrate to a pH of greater than 7, for example, about 8, about 9, about 10, or about 11, f) contacting the pH-adjusted filtrate with a chromatography stationary phase capable of binding one or more loline alkaloids at a pH of at least 7, g) contacting the chromatography stationary phase with an organic solvent to elute the one or more loline alkaloids, and h) recovering the eluate comprising one or more loline alkaloids to provide a composition comprising one or more loline alkaloids.

In one embodiment, the method comprises the preliminary step of milling the plant material, for example to a size capable of passing through a 20 mm aperture mesh.

In one embodiment, the composition or extract is suitable for use in the control of one or more insects. For example, the composition or extract is an insecticidal composition or extract.

In one embodiment the purity of the one or more loline alkaloids in the extract is at least about 50, 55, 60, 65, 70, 75, 80, 85, 90, 95, 98, or 99%.

In one embodiment the yield of the one or more loline alkaloids from the seeds or plant material in the extract is at least about 75%, at least about 80%, at least about 85%, at least about 90%, at least about 92%, at least about 94%, at least about 95%, at least about 96%, at least about 98% or at least about 99%.

The invention further relates to methods of using the composition in the control of pests, particularly plant and human or non-human animal pests, such as insects, nematodes, and herbivores.

For example, methods of controlling a pest population are also provided by the invention. The method generally involves contacting the population with a pesticidally-effective amount of a composition as described herein. Such methods may be used to kill or reduce the numbers of target pests in a given area, or may be prophylactically applied to a locus, such as an environmental area, to prevent infestation by a susceptible pest.

The invention further relates to the use of compositions of the invention for the control one or more pests, including one or more insect or nematode pests, such as one or more pathogenic insect pests, for example, one or more phytopathogenic insects or nematodes or one or more insect or nematode pests of one or more animal species.

In one embodiment, the present invention provides a method of controlling one or more insects, including one or more pathogenic insects, for example, one or more insect pests of one or more animal species, the method comprising contacting the one or more insects with a composition of the invention.

The use of the admixture, extract, fraction, eluate produced by a method of the invention in the manufacture of a composition for the control of one or more pests is similarly contemplated.

The use of the admixture, extract, fraction, eluate produced by a method of the invention or a composition of the invention in the manufacture of a medicament for treating or preventing a pest or parasitic infection in a subject is similarly contemplated.

The present invention further relates to a method for controlling one or more pests, such as one or more insects including one or more parasitic or pathogenic insects or phytopathogenic insects, the method comprising applying to a locus, such as a plant or its surroundings, a composition of the invention. The method may also comprise administering a composition of the invention to a subject infected by a parasitic or pathogenic insect pest.

In another aspect, the present invention provides a method of reversing, wholly or in part, the resistance of a pest to one or more pesticides or one or more pathogenic agents, the method comprising contacting the insect with a composition of the invention.

Optionally, the method comprises contacting the pest with a composition of the invention together with one or more pesticides or one or more pathogenic agents, or any combination thereof.

In various embodiments, the one or more pesticides or one or more pathogenic agents administered is the same as that to which the pest is or is predicted to be or become resistant.

In a further aspect, the invention provides a method of controlling one or more pests which have been contacted with a composition of the invention with an amount of a pesticide or a pathogenic agents effective to control said one or more pests.

The one or more pesticides or one or more pathogenic agents may be administered prior to, concurrently with, or after administration of the composition of the invention. Accordingly, administration of the one or more compositions of the invention and the one or more pesticides or one or more pathogenic agents may be simultaneous, sequential, or separate.

In another aspect the invention relates to a method of enhancing the growth or reproduction of a plant, the method comprising contacting the plant with a composition of the invention.

In one embodiment, the method enhances the growth or reproduction of a plant without significant phytotoxicity or symptoms of phytotoxicity.

In one embodiment, the plant is in the presence of a biotic or abiotic stress.

In one embodiment, the abiotic stress is selected from the group consisting of water deficiency, nutrient deficiency, heat stress, salt toxicity, mineral or metal toxicity, and freezing temperatures.

In one embodiment, the biotic stress is selected from the group consisting of insect infestation, nematode infestation, and herbivore grazing. In one embodiment the biotic stress is a stress caused by at least one organism selected from the group consisting of an insect, a nematode, and an herbivore.

In one embodiment, the composition comprises an admixture extract prepared using a method of the invention.

In one embodiment, the composition comprises the admixture, or an eluate, fraction or extract from the admixture or from the extract as described above.

In one embodiment, the composition is substantially free of viable endophyte.

In various embodiments, the compositions of the invention are applied prophylactically, for example before the locus, such as a plant, is infected by or exposed to the pest population, such as an insect or insect population. In other embodiments, the composition is applied when infection is established or the pathogen is present, for example when a locus such as a plant is infected by or exposed to an insect, or when an insect is present on or in the locus.

In one embodiment, compositions of the invention are applied directly to the locus, for example are applied directly to a plant or its surroundings. For example, a composition of the invention is admixed with a solvent or emulsified and applied as described herein. In other embodiments, the compositions of the invention are applied indirectly to the locus, such as for example by application to a substrate that is subsequently applied to the locus. In one embodiment the composition is applied to the locus using an irrigation system or chemigation system.

In one embodiment compositions of the invention are applied to a locus, for example a field or pasture, before planting or sowing.

In one embodiment, the composition is admixed with water to a final concentration of loline alkaloids of about 2 g, 2.5 g, 5 g, 7.5 g, 10 g, 15 g, 20 g, 25 g, 50 g, 75 g, 100 g, 125 g, 150 g, 175 g, or about 200 g per 100 L prior to application.

In one embodiment, a desiccation protection agent, such as a non-ionic surfactant is admixed to a final concentration of about 1 mL/L prior to application.

In one embodiment, the composition is admixed with water prior to application. In one embodiment, the composition is admixed with water and applied in at least about 100 L water/Ha, at least about 200 L/Ha, in at least about 250 L/Ha, in at least about 300 L/Ha, in at least about 400 L/Ha, at least about 500 L/Ha, at least about 750 L/Ha, at least about 800 L/Ha, at least about 850 L/Ha, at least about 900 L/Ha, at least about 950 L/Ha, at least about 1000 L/Ha, at least about 1250 L/Ha at least about 1500 L/Ha, at least about 1750 L/Ha, or at least about 2000 L/Ha.

In various embodiments the composition is applied at a rate of at least about 25 g lolines/hectare, at least about 50 g lolines/hectare, at least about 100 g lolines/hectare, at least about 150 g lolines/hectare, at least about 200 g lolines/hectare, at least about 250 g lolines/hectare, at least about 300 g lolines/hectare, at least about 350 g lolines/hectare, at least about 400 g lolines/hectare, at least about 500 g lolines/hectare, at least about 550 g lolines/hectare, at least about 600 g lolines/hectare, at least about 650 g lolines/hectare, at least about 700 g lolines/hectare or at least about 750 g lolines/hectare or at least about 1000 g lolines/hectare. Generally, application rates of about 100 g to about 500 g lolines/hectare are targeted.

In one embodiment, said application is by spraying. In another embodiment application is by chemigation.

In another embodiment the composition is formulated in a seed coating.

In agricultural and horticultural applications, the invention is applicable to any plant or its surroundings. Exemplary plants are in certain embodiments monocotyledonous or dicotyledonous plants such as alfalfa, barley, canola, corn, cotton, flax, kapok, peanut, potato, oat, rice, rye, sorghum, soybean, sugarbeet, sugarcane, sunflower, tobacco, tomato, wheat, turf grass, pasture grass, berry, fruit, legume, vegetable, ornamental plants, shrubs, cactuses, succulents, and trees.

In further illustrative embodiments, the plant may be any plant, including plants selected from the order Solanales, including plants from the following families: Convolvulaceae, Hydroleaceae, Montiniaceae, Solanaceae, and Sphenocleaceae, and plants from the order Asparagales, including plants from the following families: Amaryllidaceae, Asparagaceae, Asteliaceae, Blandfordiaceae, Boryaceae, Doryanthaceae, Hypoxidaceae, Iridaceae, Ixioliriaceae, Lanariaceae, Orchidaceae, Tecophilaeaceae, Xanthorrhoeaceae, and Xeronemataceae.

In another aspect the invention relates to a method of treating or preventing a pest, parasite or insect infection or infestation in a subject in need thereof, wherein the subject is a human or non-human animal subject, the method comprising administering to the subject a therapeutically effective amount of a composition of the invention.

In another aspect the invention relates to use of a composition of the invention, for example an extract or eluate, in the preparation of a composition or medicament for use in any of the methods described herein, for example, for use in treating or preventing a pest, parasite or insect infection or infestation.

In another aspect, the composition is administered topically, orally or parenterally.

In another aspect the invention provides a pharmaceutical or veterinary formulation comprising a composition of the invention and one or more pharmaceutically or veterinarily acceptable excipients, carriers, or diluents.

In one embodiment the method is for treating or preventing an ectoparasite infection or infestation, for example infection or infestation by bedbugs, fleas, flies, gnats, ticks, lice, such as head lice, or mites.

In one embodiment the invention provides a method for treating or preventing an endoparasite infection or infestation, for example infection or infestation by protozoan parasites or parasitic worms, such as helminths.

In one embodiment the composition is administered in the form of a shampoo, collar, cream, gel, drench, pour-on or spot-on formulation, suspension, lotion, ointment, spray, dressing, skin patch, tablet, capsule, bolus, elixir, or injectable.

In various embodiments the composition is applied in an amount sufficient to deliver at least about 5 µg loline alkaloids per $cm^2$ skin, at least about 10 µg, at least about 20 µg, at least about 25 µg, at least about 30 µg, at least about 40 µg, at least about 45 µg, at least about 50 µg, at least about 55 µg, at least about 60 µg, at least about 70 µg, at least about 75 µg, at least about 80 µg, at least about 90 µg or at least about 100 µg loline alkaloids per $cm^2$ skin, and useful ranges may be selected between any of these values (for example, about 5 µg to about 100 µg loline alkaloids per $cm^2$ skin, about 25 µg to about 100 µg, about 50 µg to about 100 µg, about 25 µg to about 75 µg, or about 50 µg to about 100 µg loline alkaloids per $cm^2$ skin).

In various embodiments the concentration of loline alkaloids in the pharmaceutical or veterinary formulation, for example, for topical application, is at least about 5 µg per mL, 10 µg, 20 µg, 25 µg, 30 µg, 40 µg, 45 µg, 50 µg, 55 µg, 60 µg, 70 µg, 75 µg, 80 µg, 90 µg, 100 µg, 125 µg, 150 µg, 175 µg or at least about 200 µg per mL and useful ranges may be selected between any of these values (for example, about 50 µg to about 200 µg per mL, about 50 µg to about 100 µg, about 75 µg to about 200 µg, about 75 µg to about 100 µg, or about 100 µg to about 200 µg per mL).

In pharmaceutical or veterinarian applications, the invention is applicable to human subjects or any non-human animal subjects, for example, agricultural animals such as cows, sheep, pigs, deer, and goats; companion animals, such as dogs, cats, mice, rats, rabbits, and guinea pigs and horses and birds, such as ostriches, emus, hens, geese, turkeys, and ducks; and fresh- or salt-water fish.

Other aspects of the invention may become apparent from the following description which is given by way of example only and with reference to the accompanying drawings.

It is intended that reference to a range of numbers disclosed herein (for example, 1 to 10) also incorporates reference to all rational numbers within that range (for example, 1, 1.1, 2, 3, 3.9, 4, 5, 6, 6.5, 7, 8, 9 and 10) and also any range of rational numbers within that range (for example, 2 to 8, 1.5 to 5.5 and 3.1 to 4.7) and, therefore, all sub-ranges of all ranges expressly disclosed herein are hereby expressly disclosed. These are only examples of what is specifically intended and all possible combinations of numerical values between the lowest value and the highest value enumerated are to be considered to be expressly stated in this application in a similar manner.

In this specification where reference has been made to patent specifications, other external documents, or other sources of information, this is generally for the purpose of providing a context for discussing the features of the invention. Unless specifically stated otherwise, reference to such external documents is not to be construed as an admission that such documents, or such sources of information, in any jurisdiction, are prior art, or form part of the common general knowledge in the art.

The term "comprising" as used in this specification means "consisting at least in part of". When interpreting statements in this specification which include that term, the features, prefaced by that term in each statement or claim, all need to be present but other features can also be present. Related terms such as "comprise" and "comprised" are to be interpreted in the same manner.

This invention may also be said broadly to consist in the parts, elements and features referred to or indicated in the specification of the application, individually or collectively, and any or all combinations of any two or more of said parts, elements or features, and where specific integers are mentioned herein which have known equivalents in the art to which this invention relates, such known equivalents are deemed to be incorporated herein as if individually set forth.

BRIEF DESCRIPTION OF THE DRAWINGS

The invention will now be described by way of example only and with reference to the drawings in which.

DETAILED DESCRIPTION OF THE INVENTION

Figure 1:
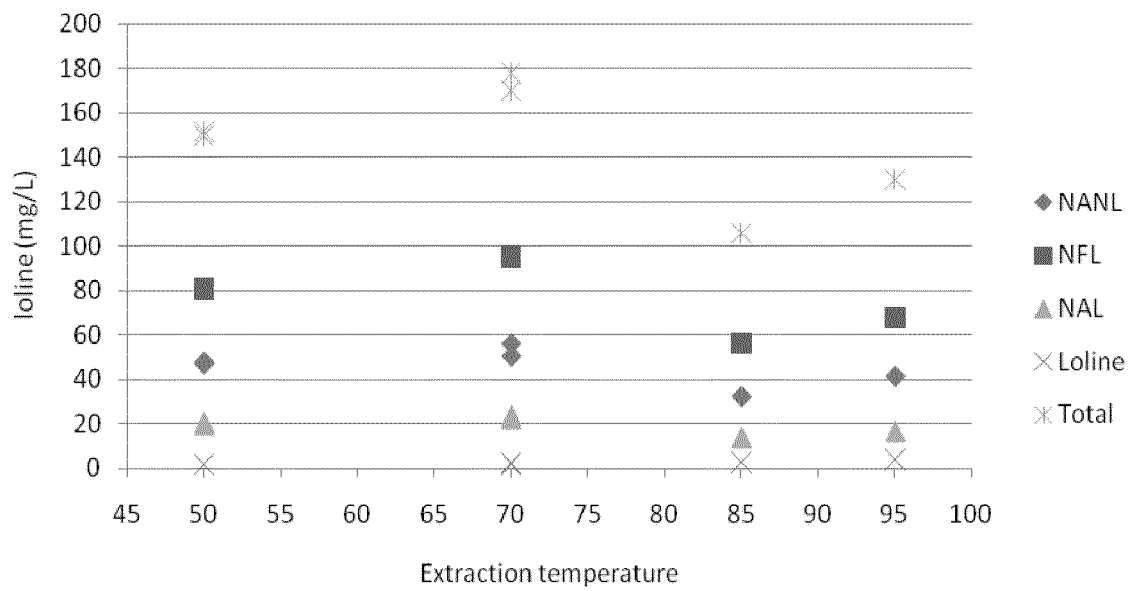
FIG. 1 shows the amount of NANL, NFL, NAL, loline and total loline alkaloids extracted at various extraction temperatures from milled meadow fescue grass.

The present invention is in part directed to methods for producing compositions comprising loline alkaloids and extracting or purifying loline alkaloids from plant materials derived from plants infected with an endophyte. The invention is also directed to the use of the compositions of the invention, for controlling pests and pest populations, enhancing plant growth or reproduction, and treating or preventing pest, insect and/or parasitic infections or infestations in humans or non-human animals.

1. Definitions

The term "and/or" can mean "and" or "or".

The term "comprising" as used in this specification means "consisting at least in part of". When interpreting each statement in this specification that includes the term "comprising", features other than that or those prefaced by the term may also be present. Related terms such as "comprise" and "comprises" are to be interpreted in the same manner.

The term "control" or "controlling" as used herein generally comprehends preventing an increase in, reducing, or eradicating [one or more members of] a population, or preventing, reducing or eradicating infection or infestation by one or more pests or pathogens, such as infection by one or more phytopathogens or pests or insects that infect humans or non-human animals, or inhibiting the rate and extent of such infection, such as reducing a pest population at a locus, for example in or on a plant or its surroundings, or treating or preventing a pest or insect infection or infestation in a human or non-human animal, wherein such prevention or reduction in the infection(s) or population(s) is statistically significant with respect to untreated infection(s) or population(s). Curative treatment is also contemplated. Preferably, such control is achieved by increased mortality amongst the pest or pathogen population.

It will be appreciated that control may be via antagonism, which may take a number of forms. In one form, the compositions of the invention may simply act as a repellent. In another form, the compositions of the invention may render the environment unfavourable for the pathogen. In a further, preferred form, the composition of the invention may parasitise, incapacitate, render infertile, impede the growth of, impede the spread or distribution of, and/or kill the pest or pathogen. Accordingly, the antagonistic mechanisms include but are not limited to antibiosis, parasitism, immobilisation, infertility, and toxicity. Therefore, compositions which act as antagonists of one or more pests can be said to have pesticidal activity. For example, compositions that act as antagonists of one or more insects can be said to have insecticidal efficacy. Furthermore, an agent or composition that is or comprises an antagonist of an pest can be said to be an pesticidal agent or a pesticidal composition, for example, an agent that is an antagonist of an insect, including an insect pest of an animal or plant, can be said to be an insecticidal agent. Likewise, a composition that is or comprises an antagonist of an insect, including an insect pest of an animal or plant, can be said to be an insecticidal composition.

Accordingly, as used herein a "pesticidal composition" is a composition which comprises or includes at least one agent that has pesticidal efficacy.

In various embodiments, said pesticidal efficacy is the ability to repel, incapacitate, render infertile, impede the growth of, or kill one or more pests, including insects, nematodes, and herbivores, preferably within 14 days of contact with the insect, more preferably within 7 days, more preferably still the ability to kill one or more phytopathogenic insects within 7 days.

Accordingly, as used herein an "insecticidal composition" is a composition which comprises or includes at least one agent that has insecticidal efficacy.

The term "extract", as used herein, encompasses a composition comprising one or more loline alkaloids obtained by extraction from a source material wherein the extract comprises or consists of a subset of compounds present in the source material. Typically, extracts will have a determinable and identifiable composition, for example a characteristic chromatography profile or mass spectragraphic profile.

The term "fraction", as used herein encompasses a composition comprising one or more loline alkaloids wherein the fraction comprises or consists of a subset of compounds present in the unfractionated source material. Typically, fractions will have a determinable and identifiable composition, for example a characteristic chromatography profile or mass spectragraphic profile.

The term "functional variant" as used herein in reference to one or more loline alkaloids, for example in respect of one or more loline alkaloids as exemplified herein in the Examples, refers to a loline alkaloid different from the specifically identified entity, for example wherein one or more groups is deleted, substituted, or added, but which possesses at least in part one or more of the biological activities of the specifically-identified entity, such as an ability to elicit one or more biological effects elicited by the specifically-identified loline alkaloid.

In the present case, the functional variant will preferably retain at least a portion of the pesticidal efficacy or activity of the specifically-identified loline alkaloid or composition of the invention.

Methods and assays to determine one or more biological effects elicited by the loline alkaloids of the invention, such as insecticidal efficacy, are well known in the art, and such methods and assays can be used to identify or verify one or more functional variants of one or more of the loline alkaloids of the invention. For example, an assay of the ability of a loline alkaloid or composition of the invention of the invention to kill or otherwise antagonise the growth of a target pest, such as those described herein in the Examples, is amenable to identifying one or more functional variants of the loline alkaloids or compositions of the invention.

The term "plant" as used herein encompasses not only whole plants, but extends to plant parts, cuttings as well as plant products including roots, leaves, flowers, seeds, stems, callus tissue, nuts and fruit, bulbs, tubers, corms, grains, cuttings, root stock, or scions, and includes any plant material whether pre-planting, during growth, and at or post harvest. Plants that may benefit from the application of the present invention cover a broad range of agricultural and horticultural crops. The compositions of the present invention are also especially suitable for application in organic production systems.

The term "plant material" as used herein, particularly with reference to the preparative methods described herein, encompasses not only whole plants, but extends to plant parts, cuttings as well as plant products including roots, leaves, flowers, seeds, stems, callus tissue, nuts and fruit, bulbs, tubers, corms, grains, cuttings, root stock, or scions. It should be appreciated on reading the present specification that the plant material can be processed in a number of ways, for example by milling, for example prior to admixture with an aqueous solution, or may be used with little or no processing, for example, where the plant material consists of whole seeds. Accordingly, the term "milled plant material" as used herein contemplates plant material that has been processed, for example by cutting, crushing, chipping, granulating, grinding, or the like, to reduce the size of the pieces of plant material. Examples of milled plant material are provided herein.

When used in respect of a pesticidal agent, such as an pesticidal composition of the invention, the phrase "retaining pesticidal efficacy" and grammatical equivalents and derivatives thereof is intended to mean that the agent still has useful pesticidal activity. Preferably, the retained activity is at least about 35, 40, 45, 50, 55, 60, 65, 70, 75, 80, 85, 90, 95, 99 or 100% of the original activity, and useful ranges may be selected between any of these values (for example, from about 35 to about 100%, from about 50 to about 100%, from about 60 to about 100%, from about 70 to about 100%, from about 80 to about 100%, and from about 90 to about 100%. For example, preferred functional variants of the loline alkaloids described herein should retain pesticidal activity, that is, retain at least about 35, 40, 45, 50, 55, 60, 65, 70, 75, 80, 85, 90, 95, 99 or 100% of the pesticidal activity of the specified parent loline alkaloid. Similarly, preferred compositions of the invention are capable of supporting the maintenance of useful pesticidal activity of the pesticidal agent(s) they comprise, and can be said to retain pesticidal activity, ideally until applied using the methods contemplated herein.

Similarly, when used in respect of an insecticidal agent, such as an insecticidal composition, the phrase "retaining insecticidal efficacy" and grammatical equivalents and derivatives thereof is intended to mean that the agent still has useful insecticidal activity. Preferably, the retained activity is at least about 35, 40, 45, 50, 55, 60, 65, 70, 75, 80, 85, 90, 95, 99 or 100% of the original activity, and useful ranges may be selected between any of these values (for example, from about 35 to about 100%, from about 50 to about 100%, from about 60 to about 100%, from about 70 to about 100%, from about 80 to about 100%, and from about 90 to about 100%). For example, preferred functional variants of the present invention should retain insecticidal activity, that is, retain at least about 35, 40, 45, 50, 55, 60, 65, 70, 75, 80, 85, 90, 95, 99 or 100% of the insecticidal activity of the specified parent loline alkaloid or fraction comprising same. Similarly, preferred compositions of the invention are capable of supporting the maintenance of useful insecticidal activity of the insecticidal agent(s) they comprise, and can be said to retain insecticidal activity, ideally until applied using the methods contemplated herein.

The term "surroundings" when used in reference to a plant subject to the methods and compositions of the present invention includes soil, water, leaf litter, and/or growth media adjacent to or around the plant or the roots, tubers or the like thereof, adjacent plants, cuttings of said plant, supports, water to be administered to the plant, and coatings including seed coatings. It further includes storage, packaging or processing materials such as protective coatings, boxes and wrappers, and planting, maintenance or harvesting equipment.

The term "oral administration" includes oral, buccal, enteral and intra-gastric administration.

The term "parenteral administration" includes but is not limited to topical (including administration to any dermal, epidermal or mucosal surface), subcutaneous, intravenous, intraperitoneal, intramuscular and intratumoural (including any direct administration to a tumour) administration.

The term "(s)" following a noun contemplates the singular or plural form, or both.

The term "subject" is intended to refer to an animal, preferably a mammal, more preferably a mammalian companion animal or human. Preferred companion animals include cats, dogs and horses. Other mammalian subjects include an agricultural animal, including a horse, a pig, a sheep, a goat, a cow, a deer, or a fowl, or a laboratory animal, including a monkey, a rat, a mouse, a rabbit or a guinea pig. Other subjects include birds, such as ostriches, emus, hens, geese, turkeys, and ducks; and fresh- or salt-water fish.

The term "treat" and its derivatives should be interpreted in their broadest possible context. The term should not be taken to imply that a subject is treated until total recovery. Accordingly, "treat" broadly includes maintaining a subject's disease progression or symptoms at a substantially static level, increasing a subject's rate of recovery, amelioration and/or prevention of the onset of the symptoms or severity of a particular condition, or extending a patient's quality of life. The term "treat" also broadly includes the maintenance of good health for sensitive individuals and building stamina for disease, infection or infestation prevention.

The term "parasitic infection", as used herein, means an infection or infestation of external parasites (ectoparasites) or internal parasites (endoparasites) in or on a subject.

2. Method for Producing, Extracting and/or Purifying Loline Alkaloids

In one aspect, the invention provides a method of producing a composition comprising one or more loline alkaloids, or a method of extracting one or more loline alkaloids, the method comprising the steps of
  a) providing whole seeds derived from a plant that is or has been infected with at least one endophyte,
  b) admixing the seeds and an aqueous solution,
  c) maintaining the admixture at a temperature of at least about 50° C. to provide an extract comprising one or more loline alkaloids,
  d) recovering the extract/supernatant, and optionally further purifying the extract, to provide a composition comprising one or more loline alkaloids.

An exemplary method of the invention comprises the following steps.

Whole seeds derived from endophyte-infected grass seed are placed in an extraction vessel. Boiling water is pumped from a heating vessel into the top of the extraction vessel. A recirculating system operates whereby water is drained from the base of the extraction vessel and returned to the heating vessel. The water level in the extraction vessel is maintained above the seed at all times.

The temperature of the seed bed is monitored throughout the process. Once the seed bed reaches 90-95° C., re-circulation continues at this temperature for 3 hours.

In alternative embodiments the extraction is conducted at lower temperatures for a longer period.

The extract is recovered from the extraction vessel.

In one embodiment the aqueous solution comprises acidified or basified water. For example, in one embodiment the water is acidified by adding a suitable amount of acetic acid, formic acid, trichloroacetic acid, hydrofluoric acid, hydrocyanic acid, hydrogen sulphide or sulphuric acid to the aqueous solvent or water. In another embodiment the water is basified by adding a suitable amount of ammonia, trimethyl ammonia, pyridine, ammonium hydroxide, sodium hydroxide or potassium hydroxide to the aqueous solvent or water.

In one embodiment the pH of the aqueous solution is from about pH 6 to about pH 9. Extraction at very acidic pH or at a pH greater than about 9 may cause hydrolysis of NFL in the extract.

The extract is cooled to a temperature of approximately 2-8° C. to precipitate solids in the extract. The pH of the extract is adjusted to pH 9 using 10M sodium hydroxide or potassium hydroxide. The extract is filtered through 20 and 5 μm sediment filters connected in series to remove the precipitated solids. In an alternative embodiment the precipitated solids are removed from the extract by centrifugation.

The filtered extract is adjusted to pH 11-12 using 10M sodium hydroxide or potassium hydroxide. In an alternative embodiment the pH is adjusted to pH 11-12 before the filtration step.

The pH-adjusted filtered extract is applied to a column packed with a reverse phase chromatography resin in water. In a particularly preferred embodiment the reverse phase chromatography resin comprises Supelco® Sepabeads SP-207 resin.

Loline alkaloids present in the extract bind to the column. Reverse osmosis (RO) water is pumped through the column. Column-bound molecules are eluted using a solvent solution and the eluate is collected in fractions. All fractions comprising loline alkaloids are combined to form an eluate.

When a reverse phase chromatography resin having a relatively small pore size is used, additional pre-filtration will likely be required. When a resin having a larger pore size are used loading of the column will be slower, and a longer column will likely be required. In various embodiments the solvent solution comprises about 65%, about 70%, about 75%, about 80%, about 85%, about 90%, or about 95%, or about 96% ethanol. In a particularly preferred embodiment the column-bound molecules are eluted using 96% ethanol. Other organic solvents may be used, preferably those miscible with water, for example methanol.

In one embodiment the solvent solution is acidified. When an acidified solvent solution is used, a lower solvent concentration may be used to elute loline alkaloids from the column. For example, in various embodiments, an acidifed solvent solution comprises about 5%, 10%, 15%, 20%, 25% or about 30% ethanol.

Ethanol is removed from the eluate by rotary evaporation to produce a dark oily residue. The residue is dissolved in water. Acetonitrile is slowly added while continuously stirring to precipitate impurities. The mixture is maintained for a period of at least 12 to 18 hours to separate the dark oily residue comprising impurities from the acetonitrile comprising the loline alkaloids. The acetonitrile phase is separated from the residue by decanting.

In alternative embodiments impurities are precipitated using water/methanol or water/ethanol solutions.

The acetonitrile phase is applied to a carbon column. Loline alkaloids bind to the carbon. In a preferred embodiment the column comprises Darco® activated charcoal (20-40 mesh, granular) preconditioned with 90% acetonitrile in water. The column is washed with additional 90% acetonitrile in water. Column-bound loline alkaloids are eluted with solvent.

Solvent is removed from charcoal purified lolines extract by rotary evaporation to produce a dried extract of loline alkaloids.

Optionally, acetonitrile is added to the dried extract to precipitate minor impurities overnight at −20° C. The acetonitrile is decanted and dried by rotary evaporation to yield a dried extract of lolines of greater than about 90% purity.

In a further aspect the invention provides a method of producing a composition comprising one or more loline alkaloids, or a method of extracting one or more loline alkaloids, the method comprising the steps of
 a) providing plant material derived from a plant that is or has been infected with at least one endophyte,
 b) admixing the plant material and water,
 c) maintaining the admixture at a temperature of at least about 65° C. to provide an extract comprising one or more loline alkaloid compound,
 d) recovering the extract, and optionally further purifying the extract, to form a composition
wherein the plant material does not comprise seeds.

A further exemplary method of the invention comprises the following steps.

In one embodiment the plant material comprises mechanically cut fresh grass passed through a 20 mm screen wherein the grass is or was infected with an endophyte. In another embodiment the plant material is unmilled.

Water of pH 11 is heated to a temperature of about 70° C. Grass is added to the heated water at a ratio of 1:10 w/v, and maintained for a period of at least about 16 to about 24 hours to produce an extract. The extract is recovered.

The extract is filtered to produce a filtered extract comprising one or more loline alkaloids.

An exemplary method of the invention comprises the following steps.

Herbage from endophyte-infected grass is milled in wood chipper fitted with a flail mill and a 20 mm mesh plate. (e.g., Pallmann double stream mill PSKM or PPSM), optionally preceded by passing the herbage through a coarse cutter to break up thatch when necessary.

The milled grass is placed in an extraction vessel. Water (50° C., 10:1 w/w water:grass) is pumped from a heating vessel into the top of the extraction vessel. A recirculating system operates whereby water is drained from the base of the extraction vessel and returned to the heating vessel. The water level in the extraction vessel is maintained above the milled grass at all times.

The temperature of the water:grass admixture is maintained at 50° C. and re-circulation continues at this temperature for at least 1 hour.

The extract is recovered from the extraction vessel, optionally with sample(s) being taken for analysis (e.g., for pesticides, toxic alkaloids, loline concentration).

The extract is cooled, and the pH of the extract is adjusted to pH 9 using 10M sodium hydroxide or potassium hydroxide. The extract is filtered through 50 μm-5 μm then 25 μm-1 μm graded-density sediment filters connected in series to remove the particulates.

The filtered extract (filtrate) is adjusted to pH 11 using 10M sodium hydroxide or potassium hydroxide in a standard stirred tank. Optionally, samples are again taken for analysis, including a determination of pH.

The pH 11 filtered extract is applied to a column packed with Supelco® Sepabeads SP-207 resin.

Loline alkaloids present in the extract bind to the column. Reverse osmosis (RO) water is pumped through the column. Column-bound molecules are eluted using azeotrope ethanol (~96%) and the eluate is collected in fractions. All fractions comprising loline alkaloids are combined to form an eluate.

In one embodiment the solvent solution is acidified. When an acidified solvent solution is used, a lower solvent concentration may be used to elute loline alkaloids from the column. For example, in various embodiments, an acidifed solvent solution comprises about 5%, 10%, 15%, 20%, 25% or about 30% ethanol.

Ethanol is removed from the eluate by rotary evaporation or falling film evaporation to produce a dark oily residue. The residue is dissolved in water.

Optionally, acetonitrile is slowly added while continuously stirring to precipitate impurities. The mixture is maintained for a period of at least 12 to 18 hours to separate the dark oily residue comprising impurities from the acetonitrile comprising the loline alkaloids. The acetonitrile phase is separated from the residue by decanting.

In an alternative embodiment, impurities are precipitated using water/methanol or water/ethanol solutions.

The acetonitrile phase is applied to a carbon column. Loline alkaloids bind to the carbon. In a preferred embodiment the column comprises Darco® activated charcoal (20-40 mesh, granular) preconditioned with 90% acetonitrile in water. The column is washed with additional 90% acetonitrile in water. Column-bound loline alkaloids are eluted with.

Solvent is removed from charcoal purified lolines extract by rotary evaporation to produce a dried extract of loline alkaloids.

Optionally, acetonitrile is added to the dried extract to precipitate minor impurities overnight at −20° C. The acetonitrile is decanted and dried by rotary evaporation to yield a dried extract of lolines of greater than about 90% purity.

The yield of one or more loline alkaloids from the plant material is at least about 0.5, about 0.6, about 0.7, about 0.75, about 0.8, about 0.9, about 1, about 1.1, about 1.2, about 1.25, about 1.3, about 1.4, about 1.5, about 1.6, about 1.75, about 1.8, about 1.9 or at least about 2 mg/g.

A particular advantage of certain embodiments of the methods herein is that loline alkaloids may be extracted from whole seeds without it being necessary to mill, grind or otherwise process the seeds before extraction. A further advantage of certain embodiments of the methods described herein, particularly those using as a starting material whole (unmilled) seeds, is a reduction in one or more lipid contaminants, protein contaminants, or polysaccharide contaminants during extraction of the one or more lolines.

Another advantage of the invention is that it provides for the production of compositions comprising loline alkaloids that are of high purity and relatively free of impurities or contaminants.

Methods for Analysing Loline Alkaloids

Methods for identifying and determining the concentration of loline alkaloids in extracts, fractions, filtrates or compositions described herein are well known in the art.

One such method utilises liquid chromatography tandem mass spectrometry (LC MS/MS) analysis. An example of such a method was utilised in the examples provided herein, in which samples are diluted in 0.1% ammonium hydroxide solution to an appropriate calibration range. The samples are separated by HPLC on a stationary phase, for example, using Acquity UPLC BEH Phenyl 1.0×50 mm, 1.7 μm resin, using a gradient from 0.1% ammonium hydroxide to 100% acetonitrile. The eluted fractions are analysed by MS/MS to identify the loline alkaloids present.

Other suitable methodologies will be apparent to a person skilled in the art on reading the specification. For example, other chromatographic methodologies, such as gas chromatography, may be used.

3. Control of Pests

A composition of the invention, effective against pests, such as insects, and suitable for use in accordance with the invention, is identified as one which is effective at reducing the population of the target pest species by a statistically significant amount with respect to the control treatment against which the composition of the invention is compared. Such compositions can be considered as having pesticidal efficacy. As described herein, the reduction in the population of the target pest may be by various antagonistic mechanisms. For example, the composition may incapacitate, render infertile, inhibit the growth or development of, and/or preferably kill the pest, or may support or promote the growth and pesticidal efficacy of one or more other pesticidal agents also present, such as a fungicide present in a composition together with the loline alkaloids of the invention (whether separately, simultaneously, or sequentially). As such, the compositions of the invention may enable or support the ability of the pesticidal agent to parasitise, incapacitate, render infertile, and/or preferably kill the pest. The compositions of the invention may also reduce the population of the target pest by rendering the environment, for example the plant to which the composition is applied or its surroundings, unfavourable for the pest. In this embodiment, the compositions may be considered to be acting as a repellent, and reducing the effective population of the target pest in the vicinity of the locus, such as a plant or its surroundings.

In various embodiments, suitable loline alkaloids of the invention or compositions of the invention exhibit about 5% pesticidal efficacy, at least about 10%, at least about 15%, at least about 20%, at least about 25%, at least about 30%, at least about 35%, at least about 40%, at least about 45%, more preferably at least about 50% pesticidal efficacy expressed as a percentage reduction of the population of the relevant insect species compared to the control treatment.

Although pesticidal efficacy is a principal requisite for a composition of the invention, such as a loline alkaloid-containing extract derived from plant source material, to be considered suitable for use as a pesticidal agent, the composition may have additional characteristics to be suitable for use as a biological control agent.

For example, the compositions of the invention should be able to be stored in effective form for a reasonable period, ultimately so as to allow it to be applied to the target locus, such as a plant or its surroundings, in a form and concentration that is effective as a biological control agent.

Those skilled in the art will recognise that the loline alkaloids and compositions of the invention may comprise or the methods of the invention may use one or more functional variants of one or more of the loline alkaloids exemplified herein. Combinations of loline alkaloids and functional variants thereof are also useful herein.

The inventors contemplate that the compositions disclosed herein will find particular utility as biological control compositions for topical and/or systemic application against a wide variety of agricultural, horticultural, medical or veterinary pests, insects and/or pathogens and in a wide variety of environments.

Agricultural and Horticultural Uses

The present invention recognises that the agricultural and horticultural sectors of many countries, including for example that of the United States of America, of New Zealand, and many states of Europe, are faced with the problem of increasing pesticide resistance amongst plant pests. This is compounded under some regulatory regimes by a reduction in the availability of new chemical insecticides due to regulatory barriers.

The use of pesticidal loline alkaloids made available by the present invention presents a solution to this problem.

The inventors contemplate that the compositions disclosed herein will find particular utility as biological control compositions for topical and/or systemic application in the horticultural and agriculture industries, such as by application to field crops, grasses, fruits and vegetables, lawns, trees, and/or ornamental plants. The compositions disclosed herein may be formulated as a spray, dust, powder, or other aqueous, atomized or aerosol for killing a pest, or controlling a pest population. The compositions disclosed herein may be used prophylactically, or alternatively, may be administered to an environment once target pests have been identified in the particular environment to be treated. The compositions may comprise an individual loline alkaloid or may contain various combinations of the loline alkaloids disclosed herein.

Regardless of the method of application, the amount of the active component(s) is applied at an pesticidally-effective amount, which will vary depending on such factors as, for example, the specific target pests to be controlled, the specific environment or location, for example the plant, crop, or agricultural site to be treated, the environmental conditions, and the method, rate, concentration, stability, and quantity of application of the pesticidally-active composition. The formulations may also vary with respect to climatic conditions, environmental considerations, and/or frequency of application and/or severity of pest infestation.

The compositions described may be made by formulating the one or more loline alkaloids, extracts, cultures or culture media and the like, optionally together with one or more other agents, with the desired agriculturally-acceptable carrier. The compositions may be formulated prior to administration in an appropriate means such as lyophilized, freeze-dried, desiccated, or in an aqueous carrier, medium or suitable diluent, such as saline or other buffer. The formulated compositions may be in the form of a dust or granular material, or a suspension in oil (vegetable or mineral), or water or oil/water emulsions, or as a wettable powder, or in combination with any other carrier material suitable for agricultural application. Suitable agricultural carriers can be solid or liquid and are well known in the art. The term "agriculturally-acceptable carrier" covers all adjuvants, inert components, dispersants, surfactants, tackifiers, binders, etc. that are ordinarily used in insecticide formulation technology; these are well known to those skilled in insecticide formulation. The formulations may be mixed with one or more solid or liquid adjuvants and prepared by various means, e.g., by homogeneously mixing, blending and/or grinding the insecticidal composition with suitable adjuvants using conventional formulation techniques.

Water-Dispersible Granules

In another important exemplary embodiment, the compositions of the invention comprise a water dispersible granule. This granule comprises one or more loline alkaloids, optionally together with one or more other agents.

Powders, Dusts, and Spore Formulations

In a third important exemplary embodiment, the compositions of the invention comprise a wettable powder, dust, spore formulation, cell pellet, or colloidal concentrate. This powder comprises one or more loline alkaloids of the invention, optionally together with one or more other agents. Such dry forms of the compositions of the invention may be formulated to dissolve immediately upon wetting, or alternatively, dissolve in a controlled-release, sustained-release, or other time-dependent manner. Such compositions may be applied to, or ingested by, the target pest, and as such, may be used to control the numbers of pests, or the spread of such pests in a given environment.

Aqueous Suspensions and Culture Filtrates or Lysates

In a fourth important exemplary embodiment, the compositions of the invention comprise an aqueous suspension of one or more loline alkaloids of the invention, optionally together with one or more lysed or otherwise killed or non-viable endophyte cells, including one or more endophyte cells used to producing a loline alkaloid of the invention disclosed herein, including for example a culture filtrate, culture supernatant, culture media or extract or fraction therefrom. Such aqueous suspensions may be provided as a concentrated stock solution which is diluted prior to application, or alternatively, as a diluted solution ready-to-apply.

When the compositions of the invention comprise intact but dead cells, such compositions may be formulated in a variety of ways. They may be employed as wettable powders, granules or dusts, by mixing with various inert materials, such as inorganic minerals (phyllosilicates, carbonates, sulfates, phosphates, and the like) or botanical materials (powdered corncobs, rice hulls, walnut shells, and the like). The formulations may include spreader-sticker adjuvants, stabilizing agents, other pesticidal additives, or surfactants. Liquid formulations may be aqueous-based or non-aqueous and employed as foams, suspensions, emulsifiable concentrates, or the like. The ingredients may include rheological agents, surfactants, emulsifiers, dispersants, or polymers.

As described herein, in one embodiment the composition comprises a culture capable of producing the loline alkaloids, and utilises solutions, suspensions, or colloidal preparations of such compositions as the active composition.

Multifunctional Formulations

In certain embodiments, for example those when the control of multiple pest species is desired, the formulations described herein may also further comprise one or more other agents, such as one or more chemical pesticides, (such as chemical pesticides, nematocides, fungicides, virucides, microbicides, amoebicides, insecticides, etc.), and/or one or more loline alkaloids having the same, or different insecticidal activities or insecticidal specificities, as the insecticidal loline alkaloids identified herein. The compositions of the invention may also be used in conjunction with other treatments such as fertilizers, weed killers, cryoprotectants, surfactants, detergents, insecticidal soaps, dormant oils, polymers, and/or time-release or biodegradable carrier formulations that permit long-term dosing of a target area following a single application of the formulation. Likewise the formulations may be prepared into edible "baits" or fashioned into pests "traps" to permit feeding or ingestion by a target pest of the composition.

The compositions of the invention may also be used in consecutive or simultaneous application to an environmental site singly or in combination with one or more additional agents, including one or more insecticides, pesticides, chemicals, fertilizers, or other compounds.

Similarly, when required, the one or more loline alkaloids produced as described herein may be separated from the endophyte by methods well known in the art, for example, by fractionation, filtering or sedimentary methodologies (eg. centrifugation), whether in combination with one or more cell-lysis steps (for example, for intracellular loline alkaloids) or not (for example, for loline alkaloids that are secreted into the growth media).

The composition of the invention may also include one or more carriers, including one or more agriculturally acceptable carriers. In one embodiment the carrier, such as an agriculturally acceptable carrier, can be solid or liquid. Carriers useful herein include any substance typically used to formulate agricultural composition.

In one embodiment the agriculturally acceptable carrier maybe selected from the group comprising fillers, solvents, excipients, surfactants, suspending agents, spreaders/stickers (adhesives), antifoaming agents, dispersants, wetting agents, drift reducing agents, auxiliaries, adjuvants or a mixture thereof.

Compositions of the invention may be formulated as, for example, concentrates, solutions, sprays, aerosols, immersion baths, dips, emulsions, wettable powders, soluble powders, suspension concentrates, dusts, granules, water dispersible granules, microcapsules, pastes, gels and other formulation types by well-established procedures.

These procedures include mixing and/or milling of the active ingredients with agriculturally acceptable carrier substances, such as fillers, solvents, excipients, surfactants, suspending agents, speaders/stickers (adhesives), antifoaming agents, dispersants, wetting agents, drift reducing agents, auxiliaries and adjuvants.

In one embodiment solid carriers include but are not limited to mineral earths such as silicic acids, silica gels, silicates, talc, kaolin, attapulgus clay, limestone, lime, chalk, bole, loess, clay, dolomite, diatomaceous earth, aluminas calcium sulfate, magnesium sulfate, magnesium oxide, ground plastics, fertilizers such as ammonium sulfate, ammonium phosphate, ammonium nitrate, and ureas, and vegetable products such as grain meals, bark meal, wood meal, and nutshell meal, cellulosic powders and the like. As solid carriers for granules the following are suitable: crushed or fractionated natural rocks such as calcite, marble, pumice, sepiolite and dolomite; synthetic granules of inorganic or organic meals; granules of organic material such as sawdust, coconut shells, corn cobs, corn husks or tobacco stalks; kieselguhr, tricalcium phosphate, powdered cork, or absorbent carbon black; water soluble polymers, resins, waxes; or solid fertilizers. Such solid compositions may, if desired, contain one or more compatible wetting, dispersing, emulsifying or colouring agents which, when solid, may also serve as a diluent.

In one embodiment the carrier may also be liquid, for example, water; alcohols, particularly butanol or glycol, as well as their ethers or esters, particularly methylglycol acetate; ketones, particularly acetone, cyclohexanone, methylethyl ketone, methylisobutylketone, or isophorone; petroleum fractions such as paraffinic or aromatic hydrocarbons, particularly xylenes or alkyl naphthalenes; mineral or vegetable oils; aliphatic chlorinated hydrocarbons, particularly trichloroethane or methylene chloride; aromatic chlorinated hydrocarbons, particularly chlorobenzenes; water-soluble or strongly polar solvents such as dimethylformamide, dimethyl sulfoxide, or N-methylpyrrolidone; liquefied gases; or the like or a mixture thereof.

In one embodiment surfactants include nonionic surfactants, anionic surfactants, cationic surfactants and/or amphoteric surfactants and promote the ability of aggregates to remain in solution during spraying.

Spreaders/stickers promote the ability of the compositions of the invention to adhere to plant surfaces. Examples of surfactants, spreaders/stickers include but are not limited to Tween and Triton (Rhom and Hass Company), Deep Fried™, Fortune®, Pulse, C. Daxoil™, Codacide Oil®, D-C. Tate™, Supamet Oil, Bond®, Penetrant, Glowelt® and Freeway, Citowett™, Fortune Plus™, Fortune Plus Lite, Fruimec, Fruimec lite, alkali metal, alkaline earth metal and ammonium salts of aromatic sulfonic acids, e.g., ligninsulfonic acid, phenolsulfonic acid, naphthalenesulfonic acid and dibutylnaphthalenesulfonic acid, and of fatty acids, alkyl and alkylaryl sulfonates, and alkyl, lauryl ether and fatty alcohol sulfates, and salts of sulfated hexadecanols, heptadecanols, and octadecanols, salts of fatty alcohol glycol ethers, condensation products of sulfonated naphthalene and naphthalene derivatives with formaldehyde, condensation products of naphthalene or naphthalenesulfonic acids with phenol and formaldehyde, polyoxyethylene octylphenol ethers, ethoxylated isooctylphenol, ethoxylated octylphenol and ethoxylated nonylphenol, alkylphenol polyglycol ethers, tributylphenyl polyglycol ethers, alkylaryl polyether alcohols, isotridecyl alcohol, fatty alcohol ethylene oxide condensates, ethoxylated castor oil, polyoxyethylene alkyl ethers, ethoxylated polyoxypropylene, lauryl alcohol polyglycol ether acetal, sorbitol esters, lignin-sulfite waste liquors and methyl cellulose. Where selected for inclusion, one or more agricultural surfactants, such as Tween are desirably included in the composition according to known protocols.

Wetting agents reduce surface tension of water in the composition and thus increase the surface area over which a given amount of the composition may be applied. Examples of wetting agents include but are not limited to salts of polyacrylic acids, salts of lignosulfonic acids, salts of phenolsulfonic or naphthalenesulfonic acids, polycondensates of ethylene oxide with fatty alcohols or fatty acids or fatty esters or fatty amines, substituted phenols (particularly alkylphenols or arylphenols), salts of sulfosuccinic acid esters, taurine derivatives (particularly alkyltaurates), phosphoric esters of alcohols or of polycondensates of ethylene oxide with phenols, esters of fatty acids with polyols, or sulfate, sulfonate or phosphate functional derivatives of the above compounds.

In one embodiment the preferred method of applying the compositions of the invention is to spray a dilute or concentrated solution by handgun or commercial airblast.

As described above, the compositions of the present invention may be used alone or in combination with one or more other agricultural agents, including pesticides, insecticides, acaracides, fungicides or bactericides (provided such fungicides or bactericides are not detrimental or toxic to any fungi or bacteria present in the composition), herbicides, antibiotics, antimicrobials, nemacides, rodenticides, entomopathogens, pheromones, attractants, plant growth regulators, plant hormones, insect growth regulators, chemosterilants, microbial pest control agents, repellents, viruses, phagostimulents, plant nutrients, plant fertilisers and biological controls. When used in combination with other agricultural agents the administration of the two agents may be separate, simultaneous or sequential. Specific examples of these agricultural agents are known to those skilled in the art, and many are readily commercially available.

Examples of plant nutrients include but are not limited to nitrogen, magnesium, calcium, boron, potassium, copper, iron, phosphorus, manganese, molybdenum, cobalt, boron, copper, silicon, selenium, nickel, aluminum, chromium and zinc.

Examples of antibiotics include but are not limited to oxytetracyline and streptomycin.

Examples of fungicides include but are not limited to the following classes of fungicides: carboxamides, benzimidazoles, triazoles, hydroxypyridines, dicarboxamides, phenylamides, thiadiazoles, carbamates, cyano-oximes, cinnamic acid derivatives, morpholines, imidazoles, beta-methoxy acrylates and pyridines/pyrimidines.

Further examples of fungicides include but are not limited to natural fungicides, organic fungicides, sulphur-based fungicides, copper/calcium fungicides and elicitors of plant host defences.

Examples of natural fungicides include but are not limited to whole milk, whey, fatty acids or esterified fatty acids.

Examples of organic fungicides include but are not limited to any fungicide which passes an organic certification standard such as biocontrol agents, natural products, elicitors (some of may also be classed as natural products), and sulphur and copper fungicides (limited to restricted use).

An example of a sulphur-based fungicide is Kumulus™ DF (BASF, Germany).

An example of a copper fungicide is Kocide™2000 DF (Griffin Corporation, USA).

Examples of elicitors include but are not limited to chitosan, Bion™, BABA (DL-3-amino-n-butanoic acid, β-aminobutyric acid) and Milsana™ (Western Farm Service, Inc., USA).

In some embodiments non-organic fungicides may be employed. Examples of non-organic fungicides include but are not limited to Bravo™ (for control of PM on cucurbits); Supershield™ (Yates, NZ) (for control of Botrytis and PM on roses); Topas™ 200EW (for control of PM on grapes and cucurbits); Flint™ (for control of PM on apples and cucurbits); Amistar™ WG (for control of rust and PM on cereals); and Captan™, Dithane™, Euparen™, Rovral™, Scala™, Shirlan™, Switch™ and Teldor™ (for control of Botrytis on grapes).

Examples of pesticides include but are not limited to azoxystrobin, bitertanol, carboxin, $Cu_2O$, cymoxanil, cyproconazole, cyprodinil, dichlofluamid, difenoconazole, diniconazole, epoxiconazole, fenpiclonil, fludioxonil, fluquiconazole, flusilazole, flutriafol, furalaxyl, guazatin, hexaconazole, hymexazol, imazalil, imibenconazole, ipconazole, kresoxim-methyl, mancozeb, metalaxyl, R-metalaxyl, metconazole, oxadixyl, pefurazoate, penconazole, pencycuron, prochloraz, propiconazole, pyroquilone, SSF-109, spiroxamin, tebuconazole, thiabendazole, tolifluamid, triazoxide, triadimefon, triadimenol, triflumizole, triticonazole and uniconazole.

An example of a biological control agent other than a fungal strain described herein is the BotryZen™ biological control agent comprising Ulocladium oudemansii.

The compositions of the invention may also comprise a broad range of additives such as stabilisers and penetrants used to enhance the active ingredients. Additives may also include compositions which assist in maintaining stability in long term storage, for example unrefined corn oil and so called invert emulsions containing a mixture of oils and waxes on the outside and water, sodium alginate and actives on the inside.

As will be appreciated by those skilled in the art, it is important that any additives used are present in amounts that do not interfere with the effectiveness of the biological control agents.

The compositions may be prepared in a number of forms. One preparation comprises a powdered form of a composition of the invention which may be dusted on to a plant or its surroundings. In a further form, the composition is mixed with a diluent such as water to form a spray, foam, gel or dip and applied appropriately using known protocols. In a presently preferred embodiment, a composition formulated as described above is mixed with water using a pressurised sprayer at about 5 g to about 350 g loline alkaloids per 100 L, at approximately 300 to about 2000 L per ha. Generally, the composition is formulated at about 5 g to about 170 g loline alkaloids per 100 L.

Compositions formulated for other methods of application such as injection, rubbing or brushing, may also be used, as indeed may any known art method. Indirect applications of the composition, for example to a plant surroundings or environment such as soil, water, or as seed coatings are contemplated.

As discussed above, the concentration at which the compositions of the invention are to be applied may vary depending on the end use, physiological condition of the plant; type (including insect species), concentration and degree of pest infection; temperature, season, humidity, stage in the growing season and the age of plant; number and type of conventional insecticides or other treatments (including fungicides) being applied; and plant treatments (such as leaf plucking and pruning).

Other application techniques, including dusting, sprinkling, soil soaking, soil injection, seed coating, seedling coating, foliar spraying, aerating, misting, atomizing, fumigating, aerosolizing, and the like, are also feasible and may be required under certain circumstances such as e.g., pests that cause root or stalk infestation, or for application to delicate vegetation or ornamental plants. These application procedures are also well-known to those of skill in the art.

The compositions of the present invention may also be formulated for preventative or prophylactic application to an area, and may in certain circumstances be applied to pets, livestock, animal bedding, or in and around farm equipment, barns, domiciles, or agricultural or industrial facilities, and the like.

The concentration of composition which is used for environmental, systemic, topical, or foliar application will vary widely depending upon the nature of the particular formulation, means of application, environmental conditions, and degree of activity.

The insecticidal formulation described above may be administered to a particular plant or target area in one or more applications as needed, with a typical field application rate per hectare ranging on the order of from about 25 g of active agent/hectare to about 500 g active agent/hectare, or alternatively, from about 500 g active agent/hectare to about 1000 g active agent/hectare may be utilized. All application rates in the range of from about 25 g of active agent per hectare to about 1,000 g active agent/hectare are contemplated to be useful in the management, control, and killing, of target insect pests using such insecticidal formulations. As such, rates of about 100 g/hectare, about 125 g/hectare, about 150 g/hectare, about 200 g/hectare, about 250 g/hectare, about 300 g/hectare, about 350 g/hectare, about 400 g/hectare, about 450 g/hectare, about 500 g/hectare, about 600 g/hectare, about 700 g/hectare, about 800 g/hectare, about 900 g/hectare, or about 1 kg/hectare, or greater of active agent may be utilized in certain agricultural, industrial, and domestic applications of the pesticidal formulations described hereinabove. Generally, application rates of about 100 g to about 500 g active agent/hectare are targeted.

Representative application rates for liquid compositions include application rates in the range of from about 50 mL of active agent per hectare to about 20 L/hectare are contemplated. As such, rates of about 100 mL/hectare, about 200 mL/hectare, about 300 mL/hectare, about 400 mL/hectare, about 500 mL/hectare, about 600 mL/hectare, about 700 mL/hectare, about 800 mL/hectare, about 900 mL/hectare, about 1 L/hectare, about 1.1 L/hectare, about 1.2 L/hectare, about 1.3 L/hectare, about 1.4 L/hectare, about 1.5 L/hectare, about 1.6 L/hectare, about 1.7 L/hectare, about 1.8 L/hectare, about 1.9 L/hectare, about 2.0 L/hectare, about 2.5 L/hectare, about 3.0 L/hectare, about 3.5 L/hectare, about 4.0 L/hectare, or about 4.5 L/hectare or greater of active agent may be utilized.

In a further aspect the present invention provides a method for controlling one or more pests, the method comprising applying to a plant or its surroundings a composition of the invention as described herein.

Young seedlings are typically most susceptible to damage from pests. Therefore, application of the compositions of the invention to freshly planted out crops, prior to emergence, is contemplated, as is application on emergence.

Repeated applications at the same or different times in a crop cycle are also contemplated. The compositions of the invention may be applied either earlier or later in the season. This may be over flowering or during fruiting. The compositions of the invention may also be applied immediately prior to harvest, or after harvest to rapidly colonise necrotic or senescing leaves, fruit, stems, machine harvested stalks and the like, for example to prevent pest colonisation. The compositions of the invention may also be applied to dormant plants in winter to slow pest growth on dormant tissues, and provide growth enhancement.

Application may be at a time before or after bud burst and before and after harvest. However, treatment preferably occurs between flowering and harvest. To increase efficacy, multiple applications (for example, 2 to 6 applications over the stages of flowering through fruiting) of the compositions of the invention is preferred.

Reapplication of the compositions of the invention should also be considered after rain. Using pest infectivity prediction models or infection analysis data, application of the BCA can also be timed to account for pest infection risk periods.

In various exemplary embodiments, the loline alkaloids of the present invention and compositions comprising such loline alkaloids are not deleterious to the plants or plant surroundings to which they are applied at dosage rates capable of achieving efficacy, such as pesticidal efficacy.

In certain embodiments, the compositions of the invention are applied in a solution, for example as described above, using a pressurised sprayer. The plant parts should be lightly sprayed until just before run off, ideally to ensure thorough coverage. Applications may be made to any part of the plant and/or its surroundings, for example to the whole plant canopy, to the area in the canopy where the flowers and developing fruit are concentrated, or to the plant stem and/or soil, water or growth media adjacent to or surrounding the roots, tubers or the like.

In certain aspects, compositions of the invention are used to control phytopathogenic insects. Phytopathogenic insects are responsible for many of the pre- and post-harvest diseases which attack plant parts and reduce growth rate, flowering, fruiting, production and may cause death of afflicted plants. As used herein, phytopathogenic insects include insects which are themselves plant pathogens, and insects which may act as a vector for other plant pathogens, for example, phytopathogenic fungi and bacteria. It will be appreciated that by controlling host insects which act as vectors for other phytopathogens, the incidence and/or severity of plant disease can be minimised.

Examples of the major phytopathogenic insects afflicting a number of important horticultural crops grown in New Zealand are presented below.

| Major Insect Pests | |
|---|---|
| Crop | Major Pest |
| Cherries | Aphids |
| Potatoes | Aphids, whitefly |

-continued

| Major Insect Pests | |
|---|---|
| Crop | Major Pest |
| Tomatoes (indoor) | Whitefly, caterpillars |
| Brassicas | Whitefly, caterpillars |
| Squash | Whitefly, aphids |
| Tamarillos | Whitefly, aphids |
| Strawberries | Aphids, thrips |
| Cucumber (indoor) | Aphids, thrips, whitefly |
| Onions | Thrips |
| Tomatoes (outdoor) | Whitefly, caterpillars, thrips |
| Capsicum | Thrips, aphids, whitefly, caterpillars |
| Lettuce | Aphids, thrips |
| Pumpkin | Whitefly, aphids |

The methods of the invention have particular application to plants and plant products, either pre- or post-harvest. For example, the composition of the invention may be applied to stored products of the type listed above including fruits, vegetables, cut flowers and seeds. Suitable application techniques encompass those identified above, particularly spraying.

The compositions of the invention can potentially be used to treat or pretreat soils or seeds, as opposed to direct application to a plant. The compositions of the invention also find use in plant processing materials such as protective coatings, boxes and wrappers.

Also encompassed by the present invention are plants, plant products, soils and seeds treated directly with a composition of the invention.

Pharmaceutical and Veterinary Uses

The present invention provides methods of treating or preventing a pest, parasite or insect infection in a human or animal subject, comprising administering a therapeutically effective amount of a composition of the invention.

The pest, parasite or insect infection may comprise infection or infestation with any human or non-human animal endoparasites or ectoparasites.

External parasites or ectoparasites include, but are not limited to, bedbugs, fleas, flies, gnats, ticks, lice, and mites, such as, *Bovicola ovis* (Sheep louse); *Bovicola bovis;* *Haematopinus eurysternus* (short-nosed cattle louse); *Hypoderma* spp.; *Haematobia irritans exigua;* *Ctenocephalides* spp, such as *Ctenocephalides felis* (cat flea) and *Ctenocephalides canis* (dog flea), *Cochliomyia* spp.; *Chrysomya* spp.; *Linognathus vituli* (long nosed cattle louse); *Pediculus humanus capitis* (human head louse), *Pediculus humanus humanus* (human body louse), *Pthirus pubis* (crab louse), *Pulex irritans* (human flea), *Solenopotes capillatus* (tubercule-bearing louse); *Sarcoptes* spp. (mange mites), including *Sarcoptes scabiei cams, Sarcoptes scabiei suis, Sarcoptes scabiei bovis, Sarcoptes scabiei* var. humani; *Psoroptes* spp., including *Psoroptes ovis* and *Dermatophgoides* spp.; *Boophilus microplus*; and *Damaliniabovis*.

Internal parasites or endoparasites include, but are not limited to, protozoan parasites, such as *Plasmodium* spp.; *Trypanosoma* spp. and *Eimeria* spp., and parasitic worms (helminths). Helminths include, but are not limited to, cestodes (flatworms), nematodes (roundworms), and trematodes (flukes), such as, *Trichostrongyloidea*, including *Haemonchus contortus; Trichostrongylus* spp.; *Dictyocaulus* spp.; *Ascaridoidea*, including *Toxocara* spp.; *Strongylus* spp.; *Filarioidea*, including *Dirofilariaimmitis* and *Onchocerca* spp: *Trematoda*, including *Fasciolahepatica* and *Schistosoma* spp.; *Taenia* spp.; and *Moniezia* spp.; *Ostertagia* spp.; *Nematodirus* spp.; *Cooperia* spp.; *Bunos-* tomum spp.; *Oesophagostomum* spp.; *Chabertia* spp, *Trichuris* spp.; *Trichonema* spp.; *Capillaria* spp.; *Heterakis* spp.; *Toxocara* spp.; *Oxyuris* spp.; *Ancylostoma* spp.; *Uncinaria* spp.; *Toxascaris* spp.; and *Parascaris* spp.

The compositions of the invention may be administered alone or in admixture with one or more pharmaceutically or veterinarily acceptable excipients, carriers, or diluents selected with regard to the intended route of administration and standard pharmaceutical or veterinarian practice.

The term "pharmaceutically or veterinarily acceptable carrier" is intended to refer to a carrier including but not limited to an excipient, diluent or auxiliary that can be administered to a subject as a component of a composition of the invention. Preferred carriers do not reduce the activity of the composition and are not toxic when administered in doses sufficient to deliver an effective amount of a composition produced by the method of the invention thereof, or, when administered, of another pesticidal agent.

Compositions of the invention may be administered topically, orally or parenterally.

For example, the compositions may be administered orally, including sublingually, in the form of capsules, tablets, elixirs, solutions, suspensions, or boluses formulated to dissolve in, for example, the colon or duodenum. The formulations may comprise excipients, such as, starch or lactose or flavouring or colouring agents.

The compositions may be injected parenterally, for example, intravenously, intramuscularly or subcutaneously. For parenteral administration, the compositions may be formulated in a sterile aqueous solution or suspension that optionally comprises other substances, such as salt or glucose.

The compositions may be administered topically, in the form of sterile creams, gels, pour-on or spot-on formulations, suspensions, lotions, ointments, dusting powders, sprays, drug-incorporated dressings, shampoos, collars or skin patches. For example, the compositions of the invention may be incorporated into a cream comprising an aqueous or oily emulsion of polyethylene glycols or liquid paraffin; an ointment comprising a white wax soft paraffin base; a hydrogel with cellulose or polyacrylate derivatives or other suitable viscosity modifiers; a dry powder; liquid spray; aerosol with butane, propane, HFA, or CFC propellants; a dressing, such as, a tulle dressing, with white soft paraffin or polyethylene glycol impregnated gauze dressings or with hydrogel, hydrocolloid, or alginate film dressings. The compositions may also be administered intra-ocularly as an eye drop with appropriate buffers, viscosity modifiers (for example, cellulose derivatives), and preservatives (for example, benzalkonium chloride).

Pour-on or spot-on formulations may be prepared by dissolving the active ingredients in an acceptable liquid carrier vehicle, such as butyl digol, liquid paraffin or non-volatile ester with or without addition of a volatile component such as isopropanol. The formulations may comprise permeation enhancers including terpenes, solvents such as fatty acid esters, triglycerides, glycerol esters, or surfactants. The formulation can be in a form suitable for direct application or in the form of a concentrate that requires dilution with a suitable quantity of water or other diluent before application. Pour-on, spot-on or, spray formulations can be prepared by encapsulation to leave a residue of active agent on the surface of the animal.

For oral administration, capsules, boluses, or tablets may be prepared by mixing the compositions of the invention with a suitable finely divided diluent or carrier, additionally containing a disintegrating agent and/or binder such as starch, lactose, talc, or magnesium stearate. A drench formulation may be prepared by dispersing the active ingredients in an aqueous solution together with dispersing or wetting agents.

The compositions of the invention may be administered with animal feedstuffs or animal drinking water by, for example, dissolving, suspending, or dispersing the compositions or formulations in the feedstuffs or water.

For parenteral administration injectable formulations may be prepared in the form of a sterile solution or emulsion.

The compositions may be used in conjunction with other antiparasitic agents to widen the spectrum of activity or to prevent the buildup of resistance. Examples of other suitable anti-parasitic agents include macrocyclic lactones, including avermectines and milbemycins, such as, abamectin, cydectin, doramectin, eprinomectin, moxidectin, ivermectin, and milbemycin; benzimidazoles, such as, albendazole, cambendazole, fenbendazole, flubendazole, mebendazole, oxfendazole, parbendazole, and oxibendazole; pro-benzimidazoles, such as, febantel, thiophanate, and netobimin; salicylanilides, such as, closantel and niclosamide; imidazothiazoles, such as, butamisole. metronidazole, tinidazole, levamisole, pyrantel pamoate, or tetramisole; tetrahydropyrimidines, such as morantel; and hexahydropyrazinoisoquinolines, such as, praziquantel. The compositions may be administered with the other antiparasitic agents separately, simultaneously, or sequentially.

A person skilled in the art will be able to readily determine the appropriate dosage and frequency of administration for treating an animal with a parasitic infection.

The exact dosage will depend upon the frequency and mode of administration, the sex, age, weight and general condition of the animal treated, the nature and severity of the condition treated and any concomitant diseases to be treated and other factors evident to those skilled in the art.

The invention consists in the foregoing and also envisages constructions of which the following gives examples only and in no way limit the scope thereof.

EXAMPLES

Example 1

This example investigates the efficiency of loline extraction from plant material using different solvent combinations.

One gram of milled grass seed powder was extracted with 9 ml of different solvent combinations for 15 minutes. The extracted samples were then centrifuged and analysed for loline content by LC MS/MS. Briefly, samples were diluted with 0.1% ammonium hydroxide solution into an appropriate calibration range and separated on an Acquity UPLC BEH Phenyl 1.0×50 mm, 1.7 µm column running a gradient from 0.1% ammonium hydroxide solution to acetonitrile. Eluted fractions were analysed by MS/MS to identify and quantify loline content by comparison with known standards.

TABLE 1

Amount of lolines (µg) extracted per gram of seed using different solvent combinations

| Solvent combination | Lolines (µg/g of seed) |
|---|---|
| $CH_2Cl_2$/MeOH/25% $NH_4OH$ 75:25:0.5 | 1600 |
| $CH_2Cl_2$/MeOH/25% Acetic acid 75:25:0.5 | 840 |
| Acetone/25% $NH_4OH$ 99.5:0.5 | 210 |

TABLE 1-continued

Amount of lolines (μg) extracted per gram of seed using different solvent combinations

| Solvent combination | Lolines (μg/g of seed) |
|---|---|
| Acetone/Acetic acid 99.5:0.5 | 130 |
| MeOH/25% NH$_4$OH 99.5:0.5 | 1600 |
| MeOH/Acetic acid 99.5:0.5 | 1100 |
| Water/Acetic acid 99.5:0.5 | 4900 |

Extraction with water acidified with acetic acid produced the greatest yield of lolines per gram of seed as shown in Table 1. Extraction using organic solvents was found to be more efficient with base added than with acid.

This example demonstrates the effective extraction of loline alkaloids from plant material using acidified water and other aqueous solvents in the method of the invention.

Example 2

This example investigates loline extraction from plant material using different solvents.

Grass seed was milled to a fine powder. One gram samples were extracted with 9 ml of different solvents (see Table 2 below) for 15 minutes with sonication. The extracted samples were then centrifuged and analysed for loline content by LC MS/MS. Briefly, samples were diluted with 0.1% ammonium hydroxide solution into an appropriate calibration range and separated on an Acquity UPLC BEH Phenyl 1.0×50 mm, 1.7 μm column running a gradient from 0.1% ammonium hydroxide solution to acetonitrile. Eluted fractions were analysed by MS/MS to identify and quantify loline content by comparison with known standards.

TABLE 2

Amount of lolines (μg) extracted per gram of seed using different solvents

| Solvent | Lolines (μg/g of seed) | | | | |
|---|---|---|---|---|---|
| | NANL | NFL | NAL | Loline | Total |
| CH$_2$Cl$_2$/MeOH/25% NH$_4$OH 75:25:0.5 | 180 | 1160 | 240 | 30 | 1600 |
| CH$_2$Cl$_2$/MeOH/25% Acetic acid 75:25:0.5 | 60 | 460 | 95 | 11 | 630 |
| Acetone/25% NH$_4$OH 99.5:0.5 | 28 | 210 | 43 | 4 | 280 |
| Acetone/Acetic acid 99.5:0.5 | 10 | 79 | 15 | 0 | 100 |
| MeOH/25% NH$_4$OH 99.5:0.5 | 130 | 1070 | 220 | 24 | 1400 |
| MeOH/Acetic acid 99.5:0.5 | 86 | 840 | 180 | 22 | 1100 |
| Water/25% NH$_4$OH 99.5:0.5 | 410 | 3300 | 680 | 73 | 4500 |
| Water/Acetic acid 99.5:0.5 | 270 | 2250 | 450 | 49 | 3000 |
| Water | 270 | 2240 | 450 | 50 | 3000 |

In this example, extraction with alkaline aqueous solvent (water with ammonia added) produced the greatest yield of total lolines per gram of seed as shown in Table 2, and also resulted in the greatest yield of each specific loline alkaloid measured. Extraction using organic solvents was found to be more efficient with base added than with acid.

This example demonstrates the effective extraction of loline alkaloids from plant material using alkaline solvents, particularly alkaline aqueous solvents such as basified water.

Example 3

This example investigates the use of chromatography separation for the purification of loline alkaloids from extracts from plant material.

100 g of 3219 seeds were milled and boiled with 900 ml of water for 10 minutes. After cooling the mixture was centrifuged and the supernatant was decanted. The total volume of liquid extract obtained was 750 ml and this was basified by the addition of 3.7 ml of concentrated ammonia.

A 25 g Strata-X reverse phase chromatography column was washed with methanol followed by 0.5% concentrated ammonia in water. A 300 ml aliquot of the 750 ml liquid extract obtained was loaded onto the column. Once all of the extract had been loaded, the column was washed with 200 ml of 0.5% concentrated ammonia. The lolines were then eluted with 4×50 ml of MeOH/0.5% ammonia (50:50 v/v).

Loline content of the extract and eluted fractions was determined as described for Example 1. The extract applied to the column comprised a total of 198 mg loline alkaloids. Assuming a loss of approximately 1 mg in the load and wash fractions, a total of 192 mg were found in the eluted fractions, representing a recovery of 97%.

This example demonstrates the effective recovery of loline alkaloids from a seed extract separated by reverse phase chromatography.

Example 4

This example investigates the efficacy of separation using a carbon source and subsequent solvent extraction for the purification of lolines in an extract.

A small scale trial was conducted using the same crude liquid extract prepared as described in Example 3 with 5 ml conc ammonia added per liter of crude extract. Carbon (Darco® activated charcoal 100 mesh) was added to the liquid extract (liquid/carbon ratio of 10/1). 99% of the lolines in the extract absorbed to carbon.

In a subsequent trial, 1 g or 1.5 g carbon was added to 50 ml of the extract. Loline absorption of 60% and 93% was achieved for the 1 g and 1.5 g samples, respectively.

The suspension for the 1.5 g sample was centrifuged and the supernatant decanted, more 0.5% conc ammonia was added, mixed, centrifuged and the supernatant decanted. The water fractions were analysed and contained only 3% of the lolines originally present.

This procedure was repeated two more times with 1.5 g carbon, yielding three similar loline samples loaded on carbon. Following the absorption of lolines onto carbon, the carbon samples the lolines were extracted using methanol, ethanol or acetonitrile. Extraction yields and with purity by comparison to the dry weight of the extract were determined using the method described in Example 1.

TABLE 3

Effect of extraction solvent on the yield and purity of lolines obtained from liquid seed extracts

| Extraction solvent | Extraction yield (%) | Loline purity (%) |
|---|---|---|
| Methanol | 51 | 30 |
| Ethanol | 79 | 31 |
| Acetonitrile | 77 | 45 |

Extraction with acetonitrile resulted in the highest yield and purity of lolines obtained from the liquid seed extract with 77% of the lolines extracted with a purity of 45% (see Table 3 above).

This example demonstrates that carbon effectively absorbs lolines, and can be used as an effective partial purification step. The example further demonstrates the efficacy of solvent extraction as a further partial purification step.

Example 5

This example assesses the feasibility of large scale extraction of whole seeds and investigates the purity of lolines isolated from such a process.

200 g of grass seeds were boiled in 1.8 L of water for 30 minutes. The mixture was cooled and filtered through a crude filter. Carbon (2% w/v) was admixed with the liquid extract. The sample was centrifuged and the supernatant was decanted. The carbon pellet was washed with a further 1 L of water and the mixture was centrifuged. The supernatant was then decanted as above.

The carbon pellet was mixed with 1 L acetonitrile and the mixture was centrifuged. The supernatant, containing lolines, was decanted and dried down. This extraction procedure was performed on 20 batches of 200 g grass seeds.

The combined residues obtained from the acetonitrile extractions were taken up in water and filtered to remove carbon fines. The total volume of liquid was about 90 ml and 10 ml of ethanol was added to this to prevent bacterial growth. Analysis of the sample showed that it contained 9.0% lolines.

This example demonstrates that lolines are effectively extracted and purified from whole seeds using the methods of the invention.

Example 6

This example investigates extraction of loline alkaloids from whole seeds using the methods described herein.

One g whole grass seed was boiled in aqueous solution (water, 0.5% ammonia or 0.5% acetic acid) for 10, 20 or 30 minutes. Samples were centrifuged and loline content of the extracts was determined. The results are shown in Table 4.

Lolines were extracted from whole seeds in all aqueous solutions tested. The yield of loline alkaloids was significantly greater at all time points in samples extracted with 0.5% ammonia than with water or 0.5% acetic acid.

This example demonstrates efficient, high yield extraction of loline alkaloids from whole seeds.

TABLE 4

Yield of loline alkaloids extracted from whole seeds in different aqueous solutions.

| Solvent | Time (min) | Lolines (µg/g) | | | | |
|---|---|---|---|---|---|---|
| | | NANL | NFL | NAL | Loline | Total |
| Water | 10 | 140 | 1525 | 245 | 30 | 1900 |
| | 20 | 230 | 2410 | 370 | 45 | 3100 |
| | 30 | 240 | 2275 | 395 | 50 | 3000 |
| 0.5% ammonia | 10 | 305 | 2435 | 460 | 55 | 3300 |
| | 20 | 395 | 3190 | 605 | 80 | 4300 |
| | 30 | 440 | 3415 | 690 | 90 | 4600 |
| 0.5% acetic acid | 10 | 125 | 1395 | 245 | 25 | 1800 |
| | 20 | 225 | 2310 | 405 | 40 | 3000 |
| | 30 | 245 | 2440 | 415 | 50 | 3200 |

Example 7

This example investigates extraction of loline alkaloids from plant material using the methods described herein.

Meadow fescue grass was milled using a Rover chipper (model 98117; 4.1 kW) with flails as the cutting surfaces, and fitted with a 20 mm mesh plate to allow the milled material to pass through. The resulting milled grass was held together like a matt. One kg herbage was extracted in 10 kg water under the conditions described in Table 5. The loline content of extracts was determined as described above for Example 1.

Extraction temperatures ranging from 50° C. to 95° C. were investigated (samples 1-6 in Table 5). The maximum amount of total lolines was extracted at a temperature of 70° C. as shown in FIG. 1 and Table 6. No difference in loline yield was observed when extraction was conducted at pH 11 (samples 2 and 4) compared with neutral pH (samples 1 and 3).

TABLE 5

Extraction conditions

| Sample | Grass processing | Extraction temp ° C. | Extraction method | pH | Extraction time |
|---|---|---|---|---|---|
| 1 | Milled | 50 | Steeping | 7 | 24 h |
| 2 | Milled | 50 | Steeping | 11 | 24 h |
| 3 | Milled | 70 | Steeping | 7 | 24 h |
| 4 | Milled | 70 | Steeping | 11 | 24 h |
| 5 | Milled | 95 | Steeping | 7 | 24 h |
| 6 | Milled | 85 | Steeping | 7 | 24 h |
| 7 | Milled | 70 | Steeping | 7 | 0 to 16 h |
| 8 | Milled | 70 | Steeping | 7 | 0 to 24 h |
| 9 | Unmilled, frozen | 70 | Steeping | 7 | 0 to 24 h |
| 10 | Unmilled, frozen | 70 | Packed bed (1.1 L/min) | 7 | 0 to 24 h |
| 11 | Unmilled, frozen | 70 | Steeping | 7 | 0 to 6 h |
| 12 | Milled | 70 | Steeping | 7 | 0 to 6 h |

TABLE 6

Total loline alkaloids extracted from milled grass at various extraction temperatures

| Sample | Temperature (° C.)/pH | Total loline (mg/g) |
|---|---|---|
| 1 | 50° C., pH 7 | 1.51 |
| 2 | 50° C., pH 11 | 1.49 |
| 3 | 70° C., pH 7 | 1.78 |
| 4 | 70° C., pH 11 | 1.70 |
| 6 | 85° C., pH 7 | 1.06 |
| 5 | 95° C., pH 7 | 1.30 |

Figure 2:
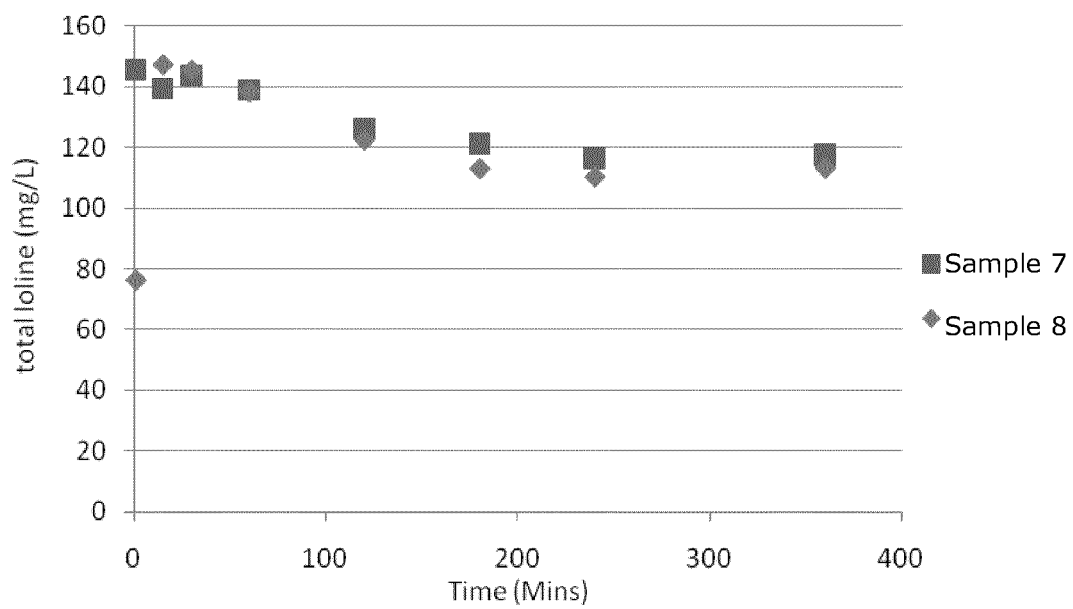
FIG. 2 shows the total loline concentration in two extracts obtained from milled meadow fescue grass in a time course over 400 minutes.

Further investigation of the efficiency of loline extraction at an extraction temperature of 70° C. over time was conducted (samples 7-10). Sampling was conducted at various time points over 16 or 24 hours. FIG. 2 presents the data obtained with samples 7 and 8 (Table 5) during the first stages of the time course. The total loline concentration of the extract decreased slightly over the extraction period as shown in FIG. 2. The NFL concentration decreased and the loline concentration increased over the time course (data not shown).

Figure 3:
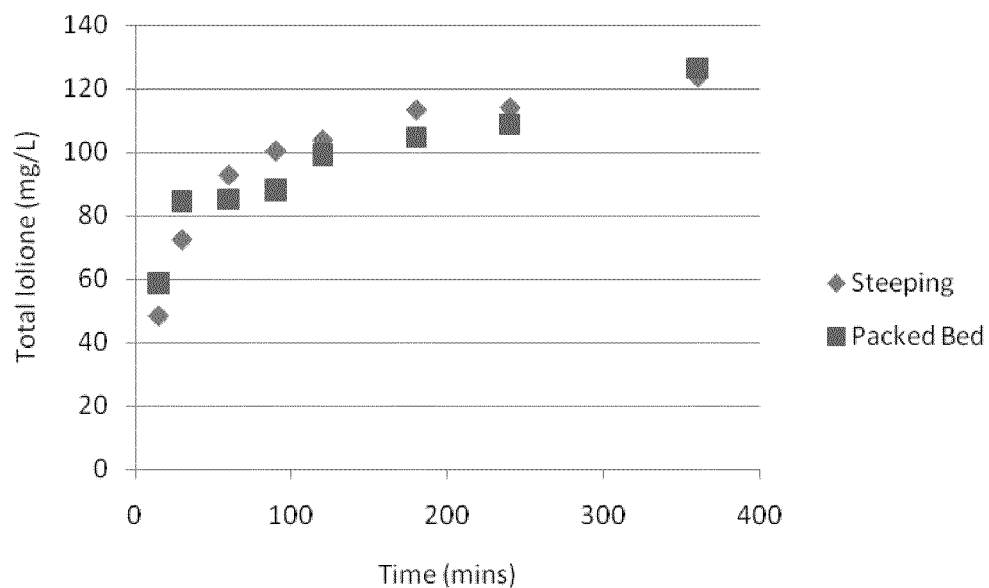
FIG. 3 shows the total loline concentration in extracts from unmilled meadow fescue grass obtained by steeping or packed bed methods at a temperature of 70° C.

A time course of loline extraction was conducted over 24 hours with unmilled meadow fescue grass, with sampling occurring at various points to identify the optimal extraction time. To identify whether the method of extraction improved the recovery of lolines from the meadow fescue two methods, batch (steeping, sample 9) and packed bed (circulating, sample 10) were conducted on unmilled grass. There was no significant difference in the loline concentration between the methods of extraction using unmilled grass as shown in FIG. 3.

Figure 4:
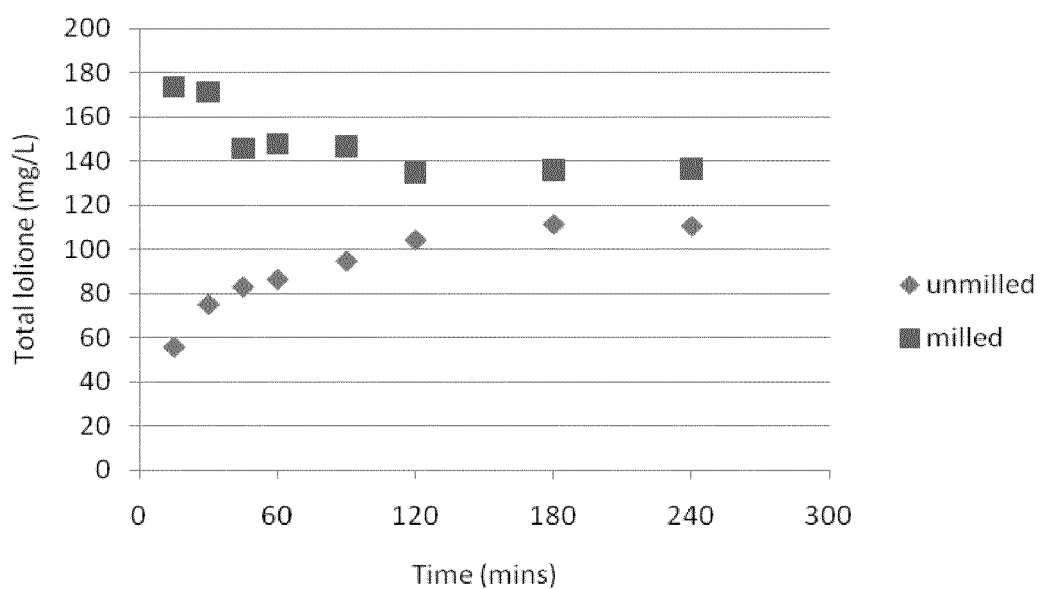
FIG. 4 shows the total loline concentration of extracts from milled and unmilled meadow fescue grass at a temperature of 70° C. over 400 minutes.

Loline extraction using a steeping method extraction from milled compared with unmilled grass was directly compared (samples 11 and 12). Loline extraction from milled grass occurred more rapidly than from unmilled grass as shown in FIG. 4. At earlier time points (0-120 minutes), a significantly higher concentration of total lolines was observed in the milled grass extract.

This example demonstrates extraction of loline alkaloids from plant material using the methods described herein. This example further demonstrates that efficient extraction using the methods described herein may be achieved using steeping or packed bed extraction and using milled or unmilled grass.

INDUSTRIAL APPLICATION

As will be evident from the above description, the present invention provides methods for the preparation of compositions comprising loline alkaloids and uses of such compositions. The compositions and methods described herein have utility in a wide range of agricultural, horticultural, medical and veterinary applications, such as providing horticulturalists with a useful means of controlling plant pests, and providing therapies for the treatment or prevention of insect infection or infestation in humans or non-human animals.

The invention claimed is:

1. A method of producing a composition comprising one or more loline alkaloids, the method, comprising:
   a) providing a plant material derived from a plant that is or has been infected with at least one endophyte,
   b) admixing the plant material and an aqueous solution,
   c) maintaining the admixture at a temperature of about 50° C. or more for a period of about 15 minutes or more to provide an extract comprising the one or more loline alkaloid compound,
   d) recovering the extract to form a composition comprising one or more loline alkaloids.

2. The method of claim 1 wherein at least some of the plant material is milled.

3. The method of claim 2 wherein the recovering comprises
   d) filtering the extract to provide a filtrate,
   e) adjusting the pH of the filtrate to a pH of greater than 7,
   f) contacting the pH-adjusted filtrate with a chromatography stationary phase capable of binding the one or more loline alkaloids at a pH of at least 7,
   g) contacting the chromatography stationary phase with an organic solvent to elute the one or more loline alkaloids, and
   h) recovering the eluate comprising the one or more loline alkaloids to provide a composition comprising the one or more loline alkaloids.

4. The method of claim 1 wherein the maintaining of the admixture is from about 1 hour to about 6 hours.

5. The method of claim 4 wherein the maintaining of the admixture is from 1 to 6 hours.

6. The method of claim 1 wherein the aqueous solution has a pH of at least 7.

7. The method of claim 1 wherein the loline alkaloids comprises one or more loline alkaloids of Formula [I]:

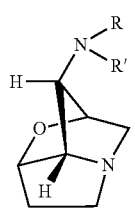

FORMULA [I]

wherein:
R is H or $CH_3$; and
R' is H, $CH_3$, CHO, or $COCH_3$.

8. The method of claim 1 wherein the or plant is derived from the genus *Festuca*.

9. The method of claim 1 wherein the aqueous solution comprises water and has a pH greater than 7.

10. The method of claim 1 wherein the plant material is milled and is admixed with the aqueous solution having a temperature of about 60° C. or more, or wherein the admixture is maintained at a temperature of about 60° C. or more, or both.

11. The method of claim 1, wherein the admixture is maintained at a temperature of about 65° C. or more.

12. The method of claim 11 wherein the admixture is maintained at a temperature of about 70° C. or more.

13. The method of claim 11 wherein the admixture is maintained at a temperature of about 80° C. or more.

14. The method of claim 11 wherein the admixture is maintained at a temperature of about 95° C. or more.

15. The method of claim 1 wherein the extract is subjected to one or more, at least partial, purification steps.

16. The method of claim 15 wherein a stationary phase for the one or more, at least partial, purification steps is a reverse phase chromatography stationary phase and comprises a styrene-divinylbenzene polymer resin.

17. The method of claim 16 wherein the pH of the extract is adjusted to a pH of about 9 or more before the extract is contacted with the stationary phase or wherein the contacting of the extract with the one or more chromatography stationary phases is at a pH of greater than 7.

18. A method of producing a composition comprising one or more loline alkaloids, the method, comprising:
   a) providing a seed from a plant that is or has been infected with at least one endophyte,
   b) admixing the plant material and an aqueous solution,
   c) maintaining the admixture at a temperature of about 50° C. or more for a period of about 15 minutes or more to provide an extract comprising the one or more loline alkaloid compound,
   d) recovering the extract to form a composition comprising one or more loline alkaloids.

19. The method of claim 18 wherein the plant is derived from the genus *Festuca*.

* * * * *